US008775447B2

(12) United States Patent  
Roberts

(10) Patent No.: US 8,775,447 B2  
(45) Date of Patent: Jul. 8, 2014

(54) PROCESSING RELATED DATASETS

(75) Inventor: Andrew F. Roberts, Melrose, MA (US)

(73) Assignee: Ab Initio Technology LLC, Lexington, MA (US)

(*) Notice: Subject to any disclaimer, the term of this patent is extended or adjusted under 35 U.S.C. 154(b) by 261 days.

(21) Appl. No.: 13/166,365

(22) Filed: Jun. 22, 2011

(65) Prior Publication Data

US 2011/0313979 A1 Dec. 22, 2011

Related U.S. Application Data

(60) Provisional application No. 61/357,376, filed on Jun. 22, 2010.

(51) Int. Cl.
*G06F 17/30* (2006.01)

(52) U.S. Cl.
USPC .......................................... 707/756; 707/809

(58) Field of Classification Search
USPC .................................................. 707/756, 809
See application file for complete search history.

(56) References Cited

U.S. PATENT DOCUMENTS

| | | | | |
|---|---|---|---|---|
| 7,701,465 B2* | 4/2010 | Suzuki et al. | ................. | 345/601 |
| 7,788,504 B2* | 8/2010 | Basile | ........................... | 713/193 |
| 7,853,938 B2* | 12/2010 | Melhem et al. | ............... | 717/152 |
| 8,237,965 B2* | 8/2012 | Takemoto | .................... | 358/1.15 |
| 2004/0078760 A1* | 4/2004 | Melhem et al. | ............... | 715/522 |
| 2005/0004918 A1 | 1/2005 | Platt | | |
| 2005/0219586 A1* | 10/2005 | Suzuki et al. | .................. | 358/1.9 |
| 2009/0231603 A1* | 9/2009 | Takemoto | ...................... | 358/1.9 |

FOREIGN PATENT DOCUMENTS

WO WO2004/063943 7/2004
WO WO 2009087872 A1 * 6/2009 ................ H04L 9/06

OTHER PUBLICATIONS

Cabot, Walter et al., "Expert Workstation for Information Systems Development." Computer Software and Applications Conference, 1990. Compsac 90. Oct. 31-Nov. 2, 1990. pp. 538-546.
International Search Report and Written Opinion for application No. PCT/US2011/041452, mailed Oct. 5, 2011, 12 pages.
IBM, "Anatomy of an archiving project," Feb. 2008, pp. 2-23.
IBM, "Application consolidation and decommissioning projects: Strategies that deliver ROI," Feb. 2009, pp. 2-19.

* cited by examiner

*Primary Examiner* — Baoquoc N To
(74) *Attorney, Agent, or Firm* — Fish & Richardson P.C.

(57) ABSTRACT

Processing related datasets includes receiving over an input device or port records from multiple datasets, the records of a given dataset having one or more values for one or more respective fields; and processing records from each of the multiple datasets in a data processing system. The processing includes: analyzing at least one constraint specification stored in a data storage system to determine a processing order for the multiple datasets, the constraint specification specifying one or more constraints for preserving referential integrity or statistical consistency among a group of related datasets that includes the multiple datasets, applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the multiple datasets.

51 Claims, 34 Drawing Sheets

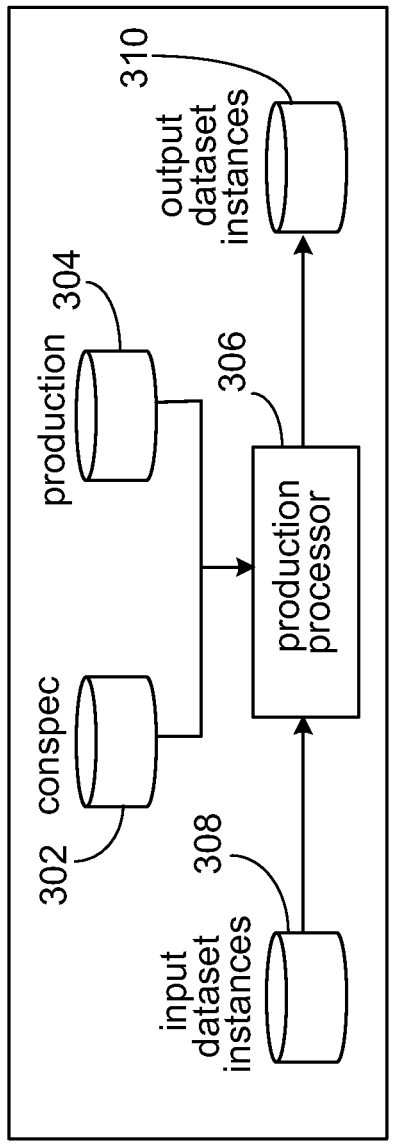
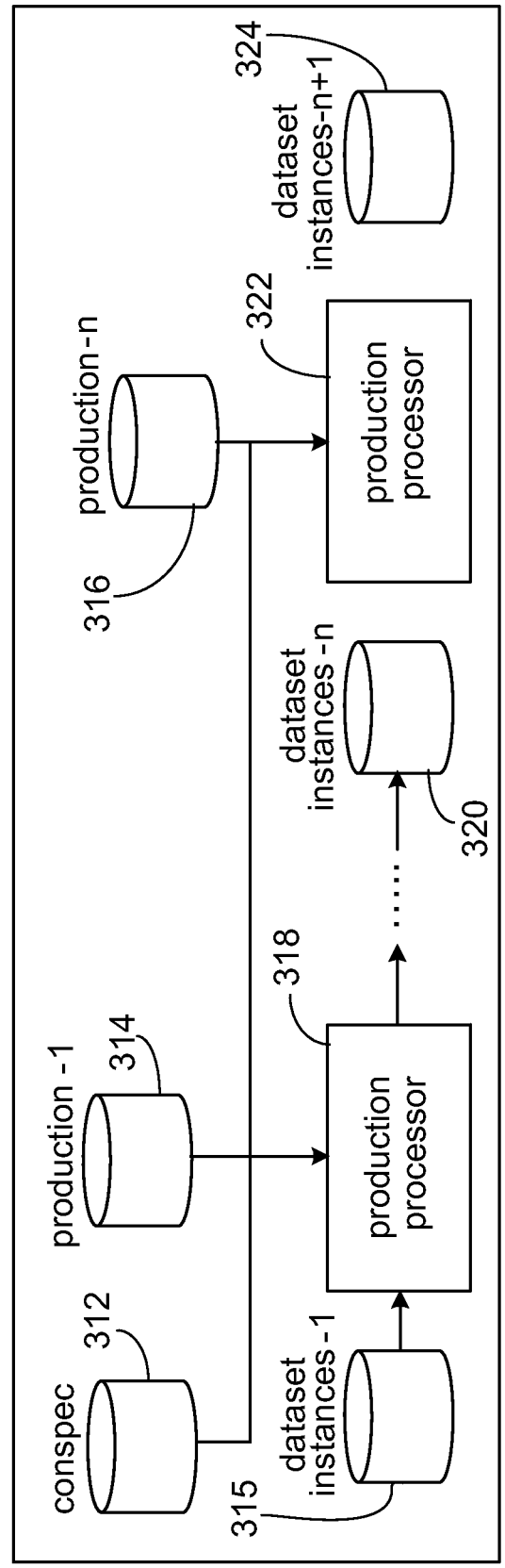
FIG. 3A
FIG. 3B

1600

```
let dml_conspec dml_dsc = gen_dml_conspec(file_path);

string("") out :: get_profiling_sql(dml_conspec dml_dsc, string("") dataset_name) =
begin
    let int j;
    let dml_dataset dml_ds = get_dml_dataset_by_name(dml_dsc, dataset_name);
    let dml_dataelement[] dml_des = get_pkey_dml_dataelements_unique(dml_dsc, dml_ds);
    let string("") sql_statement = "SELECT ";
    for (j, j < length_of(dml_des)) begin
        if (j > 0) begin
            sql_statement = sql_statement + ", ";
        end;
        sql_statement = sql_statement + "MAX(" + dml_des[j].name + ") as max_" +
            printf("%d", j) + ", MIN(" + dml_des[j].name + ") as min_" + printf("%d", j);
    end;
    sql_statement = sql_statement + " FROM " + dataset_name;
    out :: sql_statement;
end;
```

FIG. 16

```
/*
relation a_transactions, fk1, a_customers, pk1, 1
relation b_transactions, fk1, b_customers, pk1, 1
association join1 a_customers, sk1, b_customers, sk1, consumer_info,
sk1
*/ type a_customers = record
    decimal(8) custid; /* pk1.1 */
    string(10) fname;
    string(12) lname;
    string(12) place; /* sk1.1 */
    decimal(5) building_num; /* sk1.2 */
    decimal(1) preferred;
    string(1) newline ="\n";
end;

type a_transactions = record
    decimal(9) transid; /* pk1.1 */
    string(1) transtype;
    date("MMDDYY") transdate;
    decimal(8) custid; /* fk1.1 */
    string(12) prodid;
    decimal(3) quantity;
    decimal(6,2) price;
    decimal(2,2) discount;
    decimal(9) returnid;
    string(30) reason;
    string(1) newline ="\n";
end;

type b_customers = record
    decimal(',') custid; /* pk1.1 */
    string(',') firstname;
    string(',') lastname;
    string(',') place; /* sk1.1 */
    decimal('\n') building_num; /* sk1.2 */
end;

type b_transactions = record
    decimal(',') transid; /* pk1.1 */
    string(',') prodid;
    decimal(',',2) price;
    decimal(',') quantity;
    date("DD.MM.YYYY") transdate;
    string(1) comma = ",";
    decimal('\n') custid; /* fk1.1 */
end;

type consumer_info = record
    decimal(9) id; /* pk1.1 */
    string(12) firstname;
    string(14) lastname;
    string(12) place; /* sk1.1 */
    decimal(5) building_num; /* sk1.2 */
    decimal(8) est_income;
    string(1) own_or_rent;
    date("MM/DD/YYYY") since;
    string(1) newline ="\n";
end;
```

```
/*
relation dml_dataelement, fk1, dml_dataset, pk1, zero-or-more
relation dml_dataelement, fk2, dml_dataelement, pk1, zero-or-more
relation dml_datakey, fk1, dml_dataset, pk1, zero-or-more
relation dml_datakeyelement, fk1, dml_datakey, pk1, zero-or-more
relation dml_datakeyelement, fk2, dml_dataelement, pk1, zero-or-more
relation dml_datakeyrelation, fk1, dml_datakey, pk1, zero-or-more
relation dml_datakeyrelation, fk2, dml_datakey, pk1, zero-or-more
relation dml_datakeyassociationmember, fk1, dml_datakeyassociation, pk1, zero-or-more
relation dml_datakeyassociationmember, fk2, dml_datakey, pk1, zero-or-more
*/ type dml_dataset = record
    string(";") id; /* pk1.1 */
    string("\n") name; /* ak1.1 */
end;

type dml_dataelement = record
    string(";") id; /* pk1.1 */
    string(";") name; /* ak2.3 */
    string(";") dml_datasetid; /* fk1.1, ak1.1, ak2.1 */
    string(";") parent_dml_dataelementid; /* fk2.1, ak2.2 */
    string(";") qname; /* ak1.2 */
    string(";") dml_type;
    string(";") form;
    string(";") default_value;
    string(";") sequence;
    string("\n") typename = NULL;
end;

type dml_datakey = record
    string(";") id; /* pk1.1 */
    string(";") name; /* ak1.2 */
    string(";") dml_datasetid; /* ak1.1, fk1.1 */
    string("\n") keytype;
end;
```

```
type dml_datakeyelement = record
  string(";","}  dml_datakeyid;    /* pk1.1, fk1.1 */
  string(";","}  dml_dataelementid; /* pk1.2, fk2.1 */
  decimal(",";") keysequence = 1;
  string("\n")  keyelementorder = "ascending"; /* or descending */
end;

type dml_datakeyrelation = record
  string(";","}  parent dml_datakeyid; /* pk1.1, fk1.1 */
  string(";","}  child  dml_datakeyid; /* pk1.2, fk2.1 */
  string("\n")  child_cardinality;
end;

type dml_datakeyassociation = record
  string(";","}  id;   /* pk1.1 */
  string("\n")  name;  /* ak1.1 */
end;

type dml_datakeyassociationmember = record
  string(";","}  dml_datakeyassociationid; /* pk1.1, fk1.1 */
  string(";","}  dml_datakeyid;            /* pk1.2, fk2.1 */
  string("\n")  sequence = "1";
end;

type dml_conspec = record
  dml_dataset[decimal(6)]                          dml_datasets     = [vector];
  dml_dataelement[decimal(6)]                      dml_dataelements = [vector];
  dml_datakey[decimal(6)]                          dml_datakeys     = [vector];
  dml_datakeyelement[decimal(6)]                   dml_datakeyelements = [vector];
  dml_datakeyrelation[decimal(6)]                  dml_datakeyrelations = [vector];
  dml_datakeyassociation[decimal(6)]               dml_datakeyassociations = [vector];
  dml_datakeyassociationmember[decimal(6)]         dml_datakeyassociationmembers = [vector];
end;
```

```
type dml_conspec = record
    dml_dataset[int] dml_datasets = [vector];
    dml_dataelement[int] dml_dataelements = [vector];
    dml_datakey[int] dml_datakeys = [vector];
    dml_datakeyelement[int] dml_datakeyelements = [vector];
    dml_datakeyrelation[int] dml_datakeyrelations = [vector];
    dml_datakeyassociation[int] dml_datakeyassociations = [vector];
    dml_datakeyassociationmember[int] dml_datakeyassociationmembers = [vector];
end;
```

FIG. 17C

```
include "~$CONSPEC_XFR/dml_conspec_core.xfr";
let dml_conspec dml_dsc = gen_dml_conspec($"DML_CONSPEC_FILE_PATH");
let dml_dataset dml_ds = get_dml_dataset_by_name(dml_dsc, $"DATASET_NAME");
let dml_datakey[] fkeys = get_fkeys(dml_dsc, dml_ds);
```

FIG. 17D

```
out::join(in0, in1, in2) =
begin
  out.aggregate_value :1: hash_value([record place (!is_null(in0) ? in0.place :
!is_null(in1) ? in1.place : in2.place) building_num (!is_null(in0) ? in0.building_num
: !is_null(in1) ? in1.building_num : in2.building_num)],{place;building_num});
  out.source_1_hit :1: !is_null(in0);
  out.source_2_hit :1: !is_null(in1);
  out.source_3_hit :1: !is_null(in2);
end;
```

FIG. 17E  1710

```
string("") out :: get_subsetting_filter(string("") dataset_name, int reduction_factor) =
begin
  let string("") filter = "";
  switch ([vector dataset_name])
    case [vector "a_customers"] :
      filter = "0"; // 0 is the keeper channel
    case [vector "b_customers"] :
      filter = "( starts_with(in.place, 'M') ) ? 0 : 1";
  end;
  out :: filter;
end;
```

FIG. 17F  1712

```
string("") out :: get_subsetting_statement(dataset_name, element_name) =
begin
  let dml_statement statement;
  switch ([vector dataset_name, element_name])
    case [vector "a customers", "place"] :
      statement = make_statement("in.place");
    case [vector "b customers", "place"] :
      statement = make_statement("in.place");
    case [vector "a transactions", "transtype"] :
      statement = make_statement("in.transtype");
    case [vector "a transactions", "prodid"] :
      statement = make_statement("in.prodid");
    case [vector "a transactions", "price"] :
      statement = make_statement("((in.price > 1000) ? '$1000' : (in.price > 900) ? '$900' : (in.price
> 800) ? '$800' : (in.price > 700) ? '$700' : (in.price > 600) ? '$600' : (in.price
> 500) ? '$500' : (in.price > 400) ? '$400' : (in.price > 300) ? '$300' : (in.price > 200) ?
'$200' : (in.price > 100) ? '$100' : '$0')");
    case [vector "b transactions", "prodid"] :
      statement = make_statement("in.prodid");
    case [vector "b transactions", "price"] :
      statement = make_statement("((in.price > 1000) ? '>$1000' : (in.price > 500) ? '$500-
$1000' : '$0-$500')");
    case [vector "consumer info", "place"] :
      statement = make_statement("in.place");
    case [vector "consumer info", "est_income"] :
      statement = make_statement("((in.est_income > 100000) ? '>$100k' : '<$100k')");
  end;
  out :: statement;
end;
```

FIG. 17G

```
dml_rule out :: getExpansionRule(table, field, form) =
begin
  let dml_rule rule = make_rule("out." + field, "in." + field, 1d);
  switch ([vector table, field])
    case [vector "OpJob", "scheduledstarttime"] :
      rule = make_rule("out." + field,
string_concat("datetime_add(in.", field, ", 0, 0, 0, index+1)"), 1d);
    case [vector "OpJobDefinitionDependency", "predecessorjobdefinitionguid"] :
      rule = getExpandedKeyRule(table, field, form);
  end;
  out :: rule;
end;
```

FIG. 17H

```
out.jobguid :1: in.jobguid + "-pN" + printf('%d', (index+1));
```

FIG. 17I

1802 main()
　initialize an empty processing_order vector
　call gen_processing_order(vector of source datasets, vector of datasets to exclude)
　return processing_order vector gen_processing_order(sources, exclusions)
　create an empty all_results vector
　for each dataset in sources
　　get_dataset_and_its_children_recursively(next source, exclusions)
　　append the unique results all_results
　for each dataset in all_results
　　update_processing_order(next source, all_results, exclusions)

get_dataset_and_its_children_recursively( dataset, exclusions)
　call get_dataset_and_its_children(dataset, [empty vector], exclusions)
　return results

FIG. 18A

1804 ⟶ get_dataset_and_its_children(dataset, all_datasets, exclusions)
　create a results_vector and copy contents of all_datasets to it
　if dataset is not a member exclusions add it to results_vector
　get_child_datasets_for_this_dataset (i.e. those that have a foreign key reference to this)
　for each child
　　if child is not a member of results_vector, and not a member of exclusions
　　　call get_dataset_and_its_children(child, results_vector, exclusions)
　　　add results of this to results_vector return results_vector update_processing_order(dataset, all_sources, exclusions)
　get_parents_of_dataset(dataset)
　for each parent
　　if the parent is not this dataset, and parent is a member of all_sources,
　　and parent is not in processing_order, and parent not in exclusions
　　　call update_processing_order(parent, all_sources, exclusions)
　if dataset is not a member of processing_order and not a member of exclusions
　　add dataset to processing_order

FIG. 18B

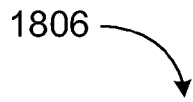

get_fkey_sort_elements(dataset, processing_order, key_index)
  get_parents(dataset, processing_order)
  get_fkeys_to_source_parents(dataset, source_parents)
  get_dml_dataelements_by_key(fkeys[index])
  format_key_string_for_elements(elements)
  return results

FIG. 18C

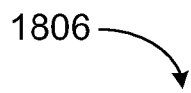

get_pkey_sort_elements(dataset, processing_order, key_index)
  get_parents(dataset, processing_order)
  get_pkeys_in_source_parents(dataset, source_parents)
  get_dml_dataelements_by_key(pkeys[index])
  format_key_string_for_elements(elements)
  return results

FIG. 18D

PROCESSING RELATED DATASETS

CROSS-REFERENCE TO RELATED APPLICATIONS

This application claims priority to U.S. Application Ser. No. 61/357,376, filed on Jun. 22, 2010, incorporated herein by reference.

BACKGROUND

This description relates to processing related datasets.

A dataset is a collection of data that is stored, for example, in a data storage system hosted on any number of physical storage media (e.g., stored in a database hosted on one or more servers). Properties of a dataset such as its structure and storage location(s) can be described, for example, by an entity such as a file or other form of object (e.g., an object stored in an object oriented database). In some cases, an entity describing a particular dataset (e.g., a file) also stores the data in that dataset. In some cases, an entity describing a particular dataset (e.g., an object pointing to a database table) does not necessarily store all of the data in that dataset, but can be used to locate the data stored in one or more locations in a data storage system.

The data in a dataset may be organized using any of a variety of structures including a record structure that provides individual records with values for respective fields (also called "attributes" or "columns"), including possibly a null value (e.g., indicating that a field is empty). For example, the records can correspond to rows in a database table of a database system, or rows in a spreadsheet or other flat file. To access records stored in a given format, a data processing system typically starts with some initial format information describing characteristics such as names of fields, the order of fields in a record, the number of bits that represent a field value, the type of a field value (e.g., string, signed/unsigned integer). In some circumstances, the record format or other structural information of the dataset may not be known initially and may be determined after analysis of the data.

Datasets can be related to each other in any of a variety of ways. For example, a first dataset corresponding to a first table in a database can include a field that has a primary key/foreign key relationship to a field of a second table in the database. The primary key field in the first table may include values that uniquely identify rows in the first table (e.g., customer ID values uniquely identifying rows corresponding to different customers), and the rows in the second table (e.g., rows corresponding to transactions made by a given customer) containing a foreign key field that corresponds to the primary key field in the first table may use one of those unique values to identify each of one or more rows in the second table that represent transactions made by a given customer. Preserving referential integrity among multiple datasets can include preserving relationships between different fields, including foreign key/primary key relationships, or other relationships for which a value in a field of one dataset depends on a value in a field of another dataset.

SUMMARY

In one aspect, in general, a method for processing related datasets includes: receiving over an input device or port records from multiple datasets, the records of a given dataset having one or more values for one or more respective fields; and processing records from each of the multiple datasets in a data processing system. The processing includes: analyzing at least one constraint specification stored in a data storage system to determine a processing order for the multiple datasets, the constraint specification specifying one or more constraints for preserving referential integrity or statistical consistency among a group of related datasets that includes the multiple datasets, applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the multiple datasets.

Aspects can include one or more of the following features.

At least one constraint for preserving referential integrity specified by the constraint specification is based on dependence of values for a field of the second dataset on values for a field of the first dataset.

The field of the first dataset is a primary key and the field of the second dataset is a foreign key that references the primary key.

The constraint specification includes a representation of a foreign key to primary key relationship between the field of the second dataset and the field of the first dataset.

Determining the processing order for the multiple datasets includes determining that the first dataset occurs before the second dataset in the processing order based on the dependence of values for the field of the second dataset on values for the field of the first dataset.

The transformations are applied to records from a third dataset of the multiple datasets before the transformations are applied to records from the second dataset and after the transformations are applied to records from the first dataset.

At least one constraint for preserving statistical consistency specified by the constraint specification is based on an equivalence between a field of the second dataset and a field of the first dataset.

The field of the first dataset and the field of the second dataset are keys in a join operation.

The constraint specification includes a representation of the join operation.

The method further includes profiling the datasets in the group of related datasets to determine statistics associated with multiple fields, including at least one field of the first dataset and at least one field of the second dataset that is indicated by the constraint specification as being equivalent to the field of the first dataset.

The one or more transformations applied to the records from the second dataset are applied based at least in part on preserving a statistical consistency between a distribution of values in the field of the first dataset and a distribution of values in the field of the second dataset according to the determined statistics and the results of applying the transformations to the records from the first dataset.

The one or more transformations are applied by at least one dataflow graph that includes nodes representing data processing components connected by links representing flows of records between data processing components, with each dataset to which the transformations are being applied providing an input flow of records to the dataflow graph.

The dataflow graph is executed successively in multiple iterations using a respective one of the multiple datasets to provide an input flow of records, in the determined processing order for the multiple datasets.

The one or more transformations applied to records of a given dataset include a subsetting transformation that reduces a number of records in the given dataset based on values in at least one field of the given dataset.

The one or more transformations applied to records of a given dataset include a modification transformation that modifies values in at least one field of the dataset.

The one or more transformations applied to records of a given dataset include an expansion transformation that increases a number of records in the given dataset based on duplication of values in at least one field of the given dataset.

The method further includes: analyzing at least one constraint specification stored in the data storage system to determine a processing order for resulting datasets that result from applying the transformations to the records from each of the multiple datasets, the constraint specification specifying one or more constraints for preserving referential integrity or statistical consistency among a group of related datasets that includes the resulting datasets, applying one or more transformations to records from each of the resulting datasets in the determined processing order, where the transformations are applied to records from a first dataset of the resulting datasets before the transformations are applied to records from a second dataset of the resulting datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the resulting datasets.

In another aspect, in general, a computer-readable medium storing a computer program for processing related datasets, the computer program including instructions for causing a computer to: receive over an input device or port records from multiple datasets, the records of a given dataset having one or more values for one or more respective fields; and process records from each of the multiple datasets in a data processing system. The processing includes: analyzing at least one constraint specification stored in a data storage system to determine a processing order for the multiple datasets, the constraint specification specifying one or more constraints for preserving referential integrity or statistical consistency among a group of related datasets that includes the multiple datasets, applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the multiple datasets.

In another aspect, in general, a data processing system for processing related datasets includes: a data storage system; an input device or port configured to receive records from multiple datasets, the records of a given dataset having one or more values for one or more respective fields; and at least one processor in communication with the input device or port and the data storage system, and configured to process records from each of the multiple datasets. The processing includes: analyzing at least one constraint specification stored in the data storage system to determine a processing order for the multiple datasets, the constraint specification specifying one or more constraints for preserving referential integrity or statistical consistency among a group of related datasets that includes the multiple datasets, applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the multiple datasets.

In another aspect, in general, a data processing system for processing related datasets includes: means for receiving records from multiple datasets, the records of a given dataset having one or more values for one or more respective fields; and means for processing records from each of the multiple datasets. The processing includes: analyzing at least one constraint specification stored in a data storage system to determine a processing order for the multiple datasets, the constraint specification specifying one or more constraints for preserving referential integrity or statistical consistency among a group of related datasets that includes the multiple datasets, applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the multiple datasets.

Aspects can include one or more of the following advantages.

The system is able to process collections of interrelated datasets while maintaining constraints such as referential integrity, statistical consistency of equivalent fields (e.g., fields related by join properties), and other constraints. In some implementations, the system enables developers who build data processing applications using dataflow graphs to build an application that processes related datasets without needing to individually connect components to produce flows that operate on record flows emanating from individual datasets. If multiple interrelated datasets require processing, the developer can provide a constraint specification for a group of datasets and data processing transformations to be applied to the datasets to enable the system to recognize constraints, such as the primary and foreign key relationships among the fields of different datasets, and perform the transformations in a way that ensures that properties such as referential integrity and statistical consistency based on those constraints are substantially maintained (e.g., within a predetermined tolerance).

The system provides a way for a developer to declare the constraints among a collection of datasets in a constraint specification represented by a data structure called a "conspec," and to configure and arrange a series of processing tasks that operate on the datasets referenced by the conspec as a group. This facilitates chaining together of multiple stages of processing tasks (e.g., by "wiring up" processing modules representing each stage) that can each operate on results of a previous stage of processing tasks applied to the entire collection of related datasets. A particular state of a given dataset is referred to as a "dataset instance." The conspec identifies constraints such as dependency relationships and equivalency relationships between elements (e.g., fields or combinations of fields) of different datasets. The particular dataset instances whose fields are being referenced by the conspec can be identified to ensure that the referenced fields correspond to fields of existing dataset instances, however, the particular dataset instances do not necessarily need to be identified since the fields being referenced can be mapped to fields of existing dataset instances at a later time. A conspec can be implemented, for example, using dataset descriptors that reference fields with field identifiers that logically represent at least some of the fields of a dataset, and using linking data structures that associate field identifiers in a variety of different ways to represent different constraints among the referenced fields. The dataset descriptors are not necessarily required to correspond to currently existing dataset instances. Thus, a given conspec may apply to any number of datasets instances as long as the fields being referenced by the constraints are present in those dataset instances. An input dataset instance, representing a given dataset in a first state, can be transformed along with other datasets in a group to yield a corresponding output dataset instance, representing the given dataset in a second state. The output dataset instance can replace the input dataset instance if the transformations operate on the original dataset, or the output dataset instance can exist along with the input dataset instance if the transformations operate on a copy of the original dataset.

An example of a typical use case concerns generation of test data that involves filtering of records from a group of multiple datasets, followed by expansion, or copying of records to create new records, all while maintaining referential integrity among the different datasets. The conspec provides sufficient information about the relationships among the datasets to enable the system to perform this task as a filter operation applied to the group of datasets, followed by an expansion operation applied to the group of datasets. The multiple output dataset instances flowing out of the first operation feed into the second operation, and result in a second set of output dataset instances. The term "dataset" when used in the context of a conspec refers to the definition of certain characteristics of a dataset including the record format and other structural relationships among elements (such as primary and foreign key elements), and the term "dataset instance" refers to the physical collection of bytes that represent records (in the format prescribed by the conspec) of a dataset in a given state.

In one example, suppose there are two datasets referenced by a conspec, namely a "customers" dataset and a "transactions" dataset. Furthermore, suppose the transaction dataset has a custid field that is a foreign key reference to a field in the customer dataset. The filtering task may involve filtering customers followed by filtering of transactions, but due to the key relationship defined in the conspec, the system filters transactions such that transactions are only included that refer to customers that have been already included. The system is able to maintain the relationships among datasets, while still performing the customized filtering operations on each dataset.

For the second operation of expanding records, the task may involve copying of transaction records to create new records with "fanned out values," but doing so in a manner in which new transactions are "bent" so that they reference new customers where possible. In other words, since the conspec defines a parent/child relationship between customers and transactions, it may be desired that new transactions reference new customers where possible. The system is able to maintain these relationships while carrying out specific record copying, and field modification operations.

Other features and advantages of the invention will become apparent from the following description, and from the claims.

DESCRIPTION OF DRAWINGS

FIGS. 3A and 3B are schematic diagrams showing relationships between different entities used by the data processing system.

FIGS. 16 and 17A-17I show listings of a package file.

FIGS. 18A-18D show logic examples.

DESCRIPTION

Figure 1:
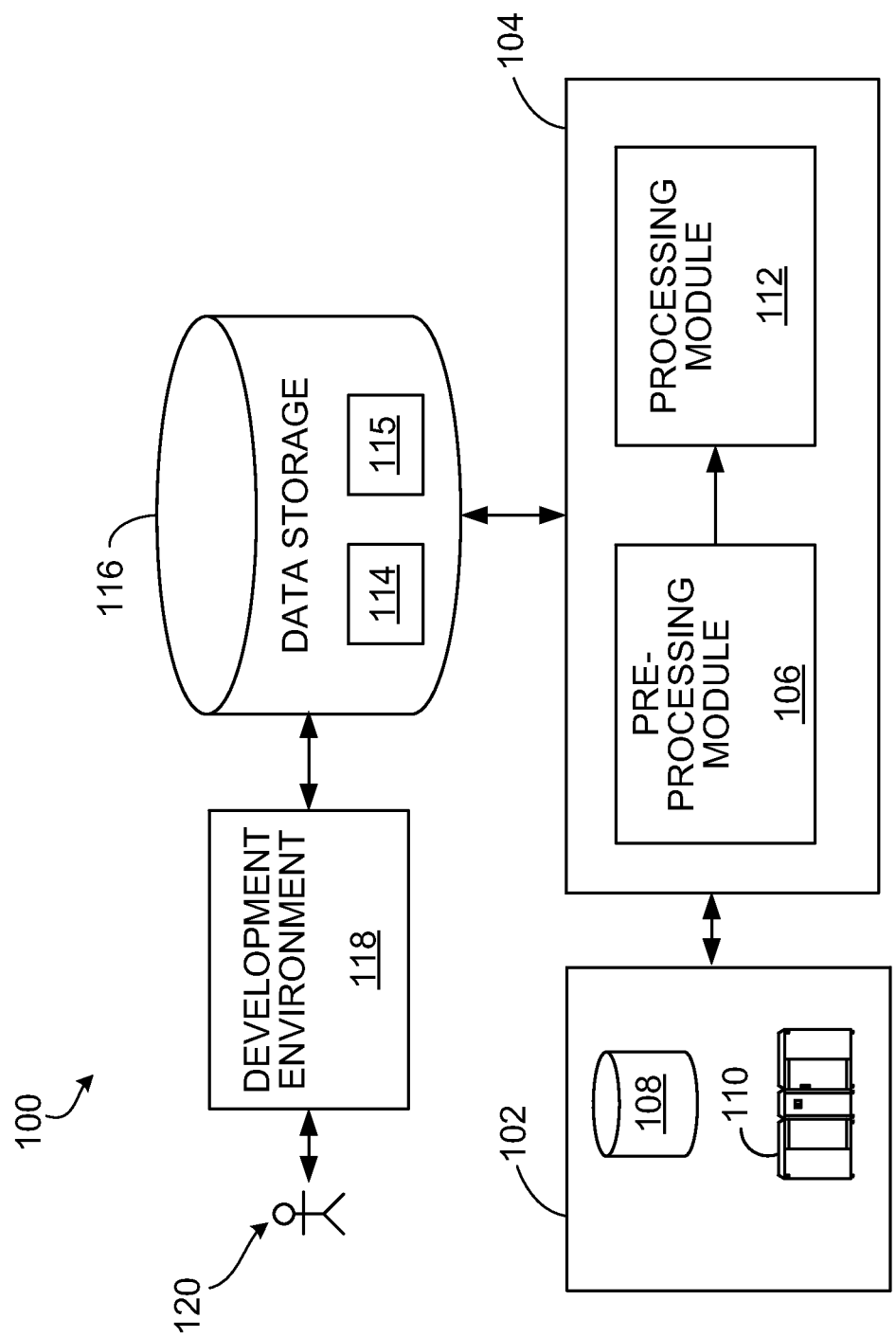
FIG. 1 is a block diagram of a system for processing related datasets.

FIG. 1 shows an exemplary data processing system 100 in which the dataset processing techniques can be used. The system 100 includes a data source 102 that may include one or more sources of data such as storage devices or connections to online data streams, each of which may store datasets in any of a variety of storage formats (e.g., database tables, spreadsheet files, flat text files, or a native format used by a mainframe). An execution environment 104 includes a pre-processing module 106 and a processing module 112. The execution environment 104 may be hosted on one or more general-purpose computers under the control of a suitable operating system, such as the UNIX operating system. For example, the execution environment 104 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via a local area network (LAN) and/or wide-area network (WAN)), or any combination thereof.

The pre-processing module 106 reads a constraint specification represented by a data structure, conspec 114, stored in a data storage system 116 accessible to the execution environment 104, and rules for applying transformations to records of a group of datasets represented by a data structure, rules 115 stored in the data storage system 116. The pre-processing module 106 outputs information used by the processing module 112 to apply the transformations to the records in the appropriate manner (e.g., in a specified order) and store or output the results. The records that are processed by the processing module 112 are supplied by a data source 102. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104, over a remote connection.

The data storage system 116 is also accessible to a development environment 118 in which a developer 120 is able to generate the conspec 114 and the rules 115. The development environment 118 and execution environment 104 are, in some implementations, configured for developing and executing applications as dataflow graphs. Various types of computations can be expressed as a data flow through a directed graph (called a "dataflow graph"), with components of the computation being associated with the vertices of the graph and data flows of work elements (e.g., records) between the components corresponding to links (arcs, edges) of the graph. The vertices can represent data processing components or datasets. The data processing components receive data at one or more input ports, process the data, and provide data from one or more output ports, and datasets that act as a source or sink of the work elements. A system that implements such graph-based computations is described in U.S. Pat. No. 5,966,072, entitled "EXECUTING COMPUTATIONS EXPRESSED AS GRAPHS," incorporated herein by reference. An example of a development environment for developing graph-based applications is described in more detail in U.S. Publication No. 2007/0011668, entitled "Managing Parameters for Graph-Based Applications," incorporated herein by reference.

Figure 2:
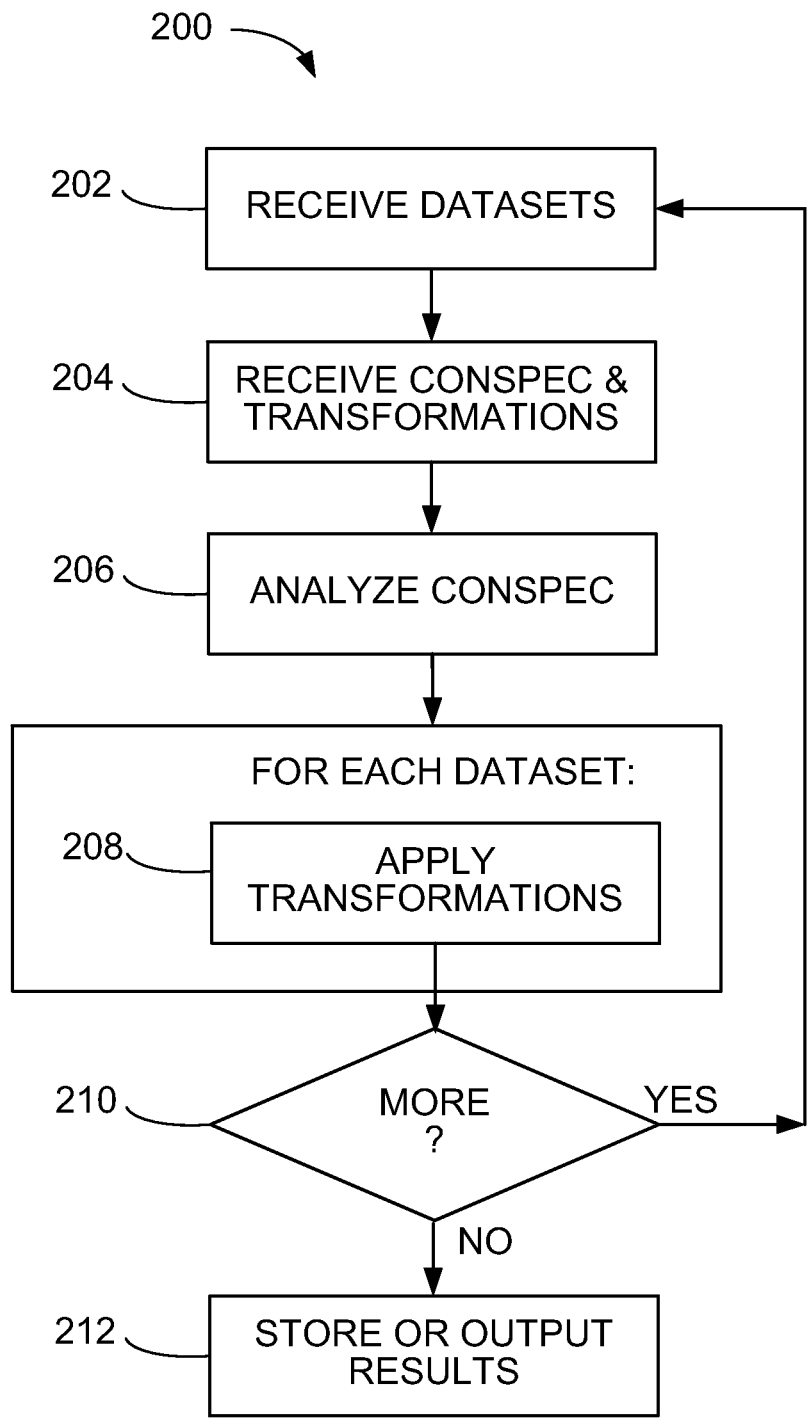
FIG. 2 is a flowchart of an exemplary data processing procedure.

FIG. 2 shows a flowchart for an exemplary dataset processing procedure 200. The procedure 200 is performed, for example, by the pre-processing module 106 and processing module 112. The pre-processing module 106 receives (200) (over an input device or port of the system) records from multiple datasets, and the pre-processing module 106 receives (204) a constraint specification (conspec 114) and one or more transformations (rules 115) stored in the data storage system 116. The pre-processing module 106 analyzes (206) the constraint specification to determine a processing order for the multiple datasets. Based on input from the pre-processing module 106, the processing module 112 applies one or more transformations defined in the rules 115 to records from each of the multiple datasets in the determined processing order. The transformations are applied (208) to records from each dataset of the multiple datasets in turn in respective iterations. The transformations applied to the records from a given dataset are applied based at least in part on results of applying the transformations to the records from a previously processed dataset and at least one constraint between the previously processed dataset and the given dataset specified by the constraint specification. The procedure 200 determines (210) whether more sets of transformations are to be applied (e.g., based on additional sets of rules), and if so, the procedure loops using the output dataset instances generated from the previous set of transformations as input dataset instances for the next set of transformations. After the transformations are finished, the system stores or outputs results (212) of the transformations. In other examples of the data processing procedure, the steps can be modified, for example, to include other steps (e.g., profiling the datasets, as described in more detail below), or to occur in a different order (e.g., the processing order for the multiple datasets can be determined based on the constraint specification before the datasets are received).

In one aspect, the system provides a computational module that operates on records from a collection of datasets. This computational module can be implemented using dataflow graphs that are configured using input parameters that define transformations involving multiple of the datasets referenced in the conspec 114, based on the rules 115 and the constraints specified by the conspec 114. Some of the dataflow graphs are used for the pre-processing of the pre-processing module 106, called "pre-processing graphs," and some of the dataflow graphs are used for the processing of the processing module 112 by being configured according to parameters provided by the pre-processing graphs. The dataflow graphs can be controlled, for example, using a task scheduling environment that controls execution of dataflow graphs and is able to iteratively execute a dataflow graph to process records in a series of dataset instances identified by input parameters, as described in more detail below.

In another aspect, the system provides a standard representation of a conspec that is able to be serialized and read into an "in memory" representation (e.g., stored in a local memory that is accessible to the execution environment 104) that enables pre-processing graphs to walk the relationships and write transform logic and other information, such as processing orders for the individual datasets within a conspec. For example, a representation using a Data Manipulation Language (DML) that enables definition of operations for manipulating data in a form that can be executed within a dataflow graph would allow a transform in a pre-processing graph to examine all of the datasets defined in a conspec, and based on the primary and foreign key relationships, along with multi-dataset join operations, determine the parent-to-child processing order of datasets, along with the join key elements (elements that are used as keys in a join operation) required to process child records in the context of their parent records.

In another aspect, the system provides a standard representation of the transform rules that may be applied to the records of the datasets referenced by a conspec. This representation of the transform rules is referred to as a "production". A production also decouples the rules that may be associated with a specific transformation from the constraints that are defined in a conspec. For example, one may define a collection of primary and foreign keys and key-element members in a conspec, and then define a scrambling, or masking rule to be applied to a primary key field in a production. The separation of the rule from the conspec enables one to define many different production rules. The production rules are all independent of the conspec, and yet, when any particular production is applied, the system will ensure that not only is the primary key field scrambled, but so are the foreign key references in other datasets, due to the constraints defined in the conspec. The product rules can be implemented in one of a variety of ways, for example, as production transforms.

FIG. 3A shows an example of the relationships among a conspec 302, a production 304, and the "production processor" 306 (e.g., implemented using dataflow graphs) that reads both of these and applies the processing steps to records of the input dataset instances. The production is responsible for identifying the location of each input dataset instance 308, as well as the target identity and location of each output dataset instance 310.

FIG. 3B shows a sequence of daisy chained productions, where the output dataset instances of one production 314 serve as the inputs to the next production 316. While the dataset instances 315, 320, 324 involved will be the same from production to production (due to the same conspec 312 feeding each production), the production processor 318, 322 at each step may apply a different processing order from that of the preceding production, depending upon the nature of the production rules.

The conspec provides a "higher level" of abstraction for the collection of datasets referenced by a conspec than the level of abstraction for a single dataset (which represents a specific collection of data), and simplifies the development of dataflow applications that involve chaining of multiple conspec-level operations (operations performed on the collection of datasets according to the specified constraints) such as filtering, masking, and data expansion. The system may include a collection of pre-built types of production rules, but may also provide extension points to allow developers to define additional types of transforms. For example, one may desire to build a data reporting type of production that would generate charts and reports for individual datasets, while providing rolled up results across multiple datasets in the conspec. This new type of production may utilize the basic ordered traversal mechanism offered in the base processor for all production rules, but may add in data aggregation and chart generation functions for each of the processed datasets.

Figure 4A:
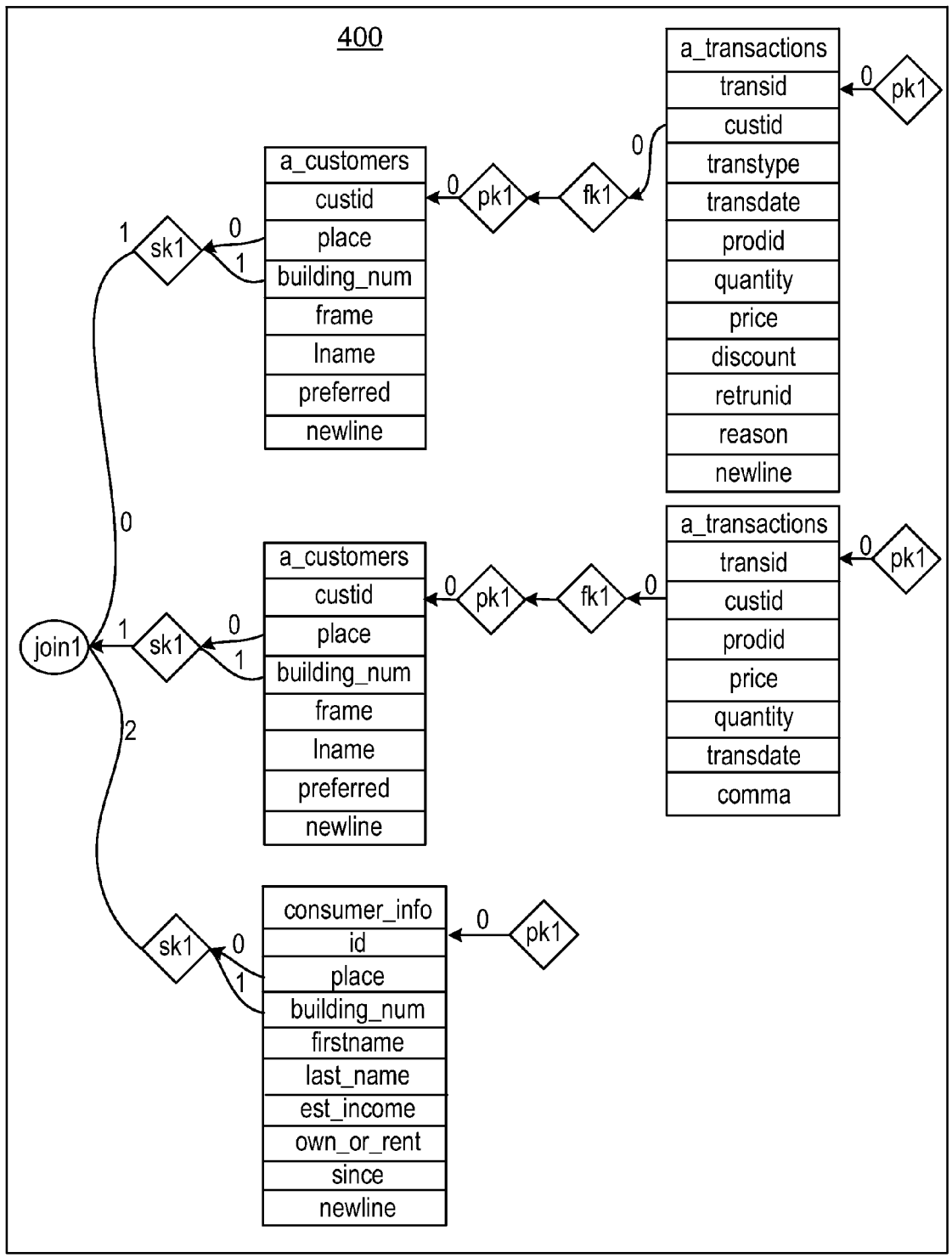
FIGS. 4A and 4B are schematic diagrams of conspec data structures.

FIG. 4A shows a conspec 400, called ab_conspec, which is an example of constraints among a collection of related datasets for a typical production operation that may be applied to the records of corresponding dataset instances associated with the conspec (e.g., dataset instances that have the same fields as the datasets referenced by the conspec). The conspec 400 shows two customer datasets (a_customers and b_customers), their child transaction datasets (a_transactions and b_transactions), and a consumer_info dataset, providing household information. A 3-way join association defines an "equivalence" property among keys from the customers and consumer_info datasets, and two relations describe parent-child "dependency" properties between customers and transactions.

Figure 4B:
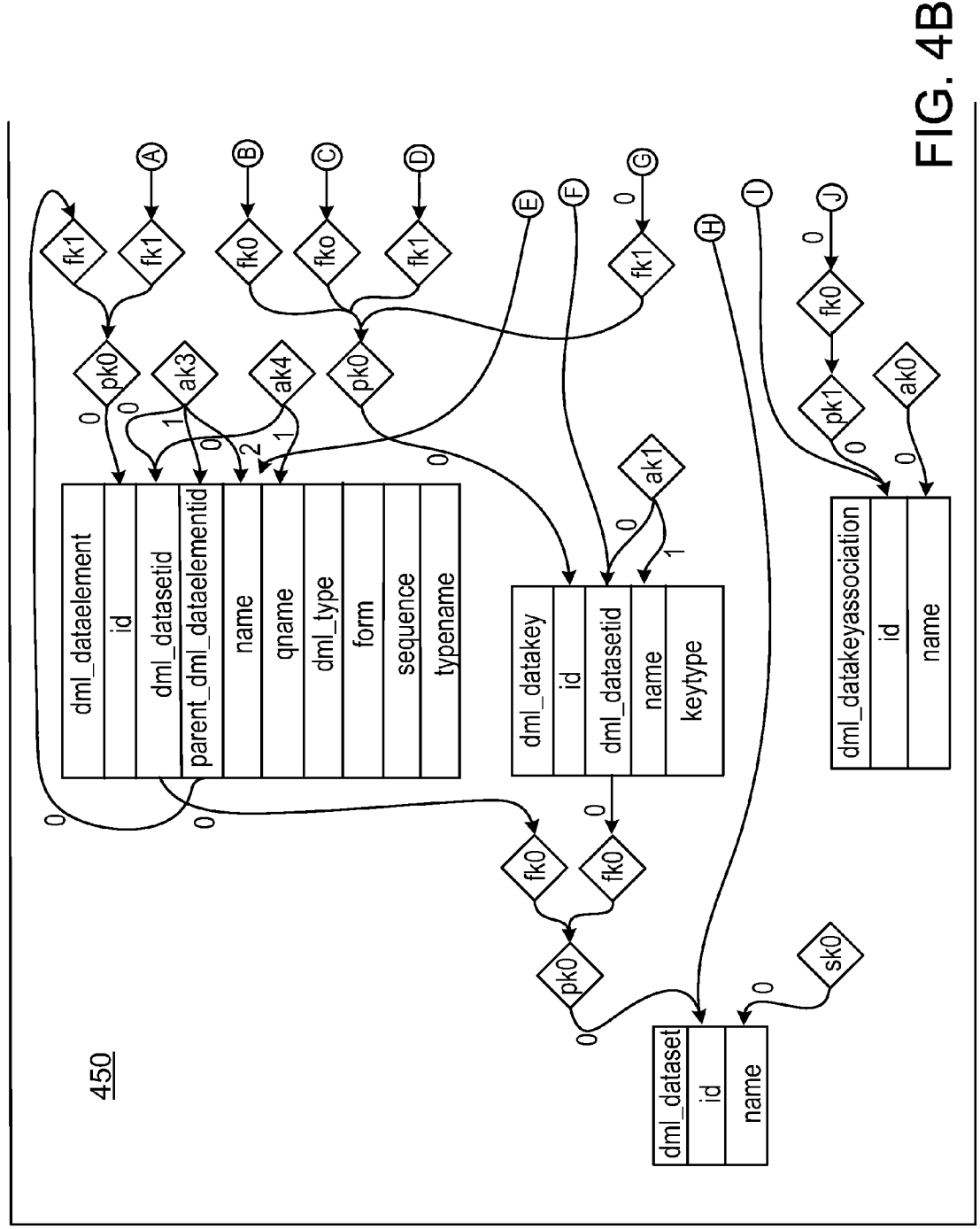
Figure 4B:
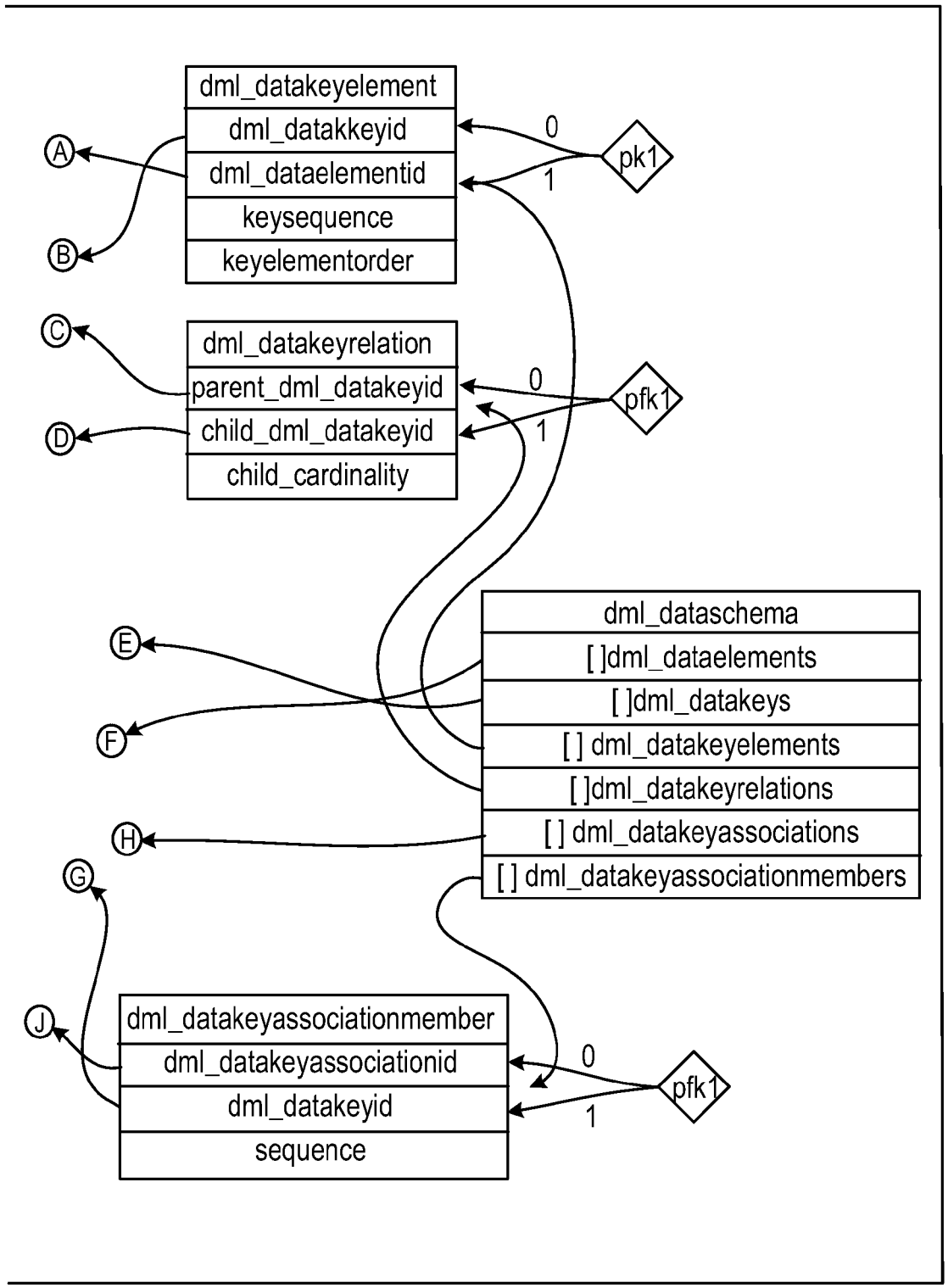

FIG. 4B illustrates an example of a conspec 450 that defines relationships among the multiple datasets referenced by a conspec. This may be interpreted as a conspec for conspecs.

Figure 5:
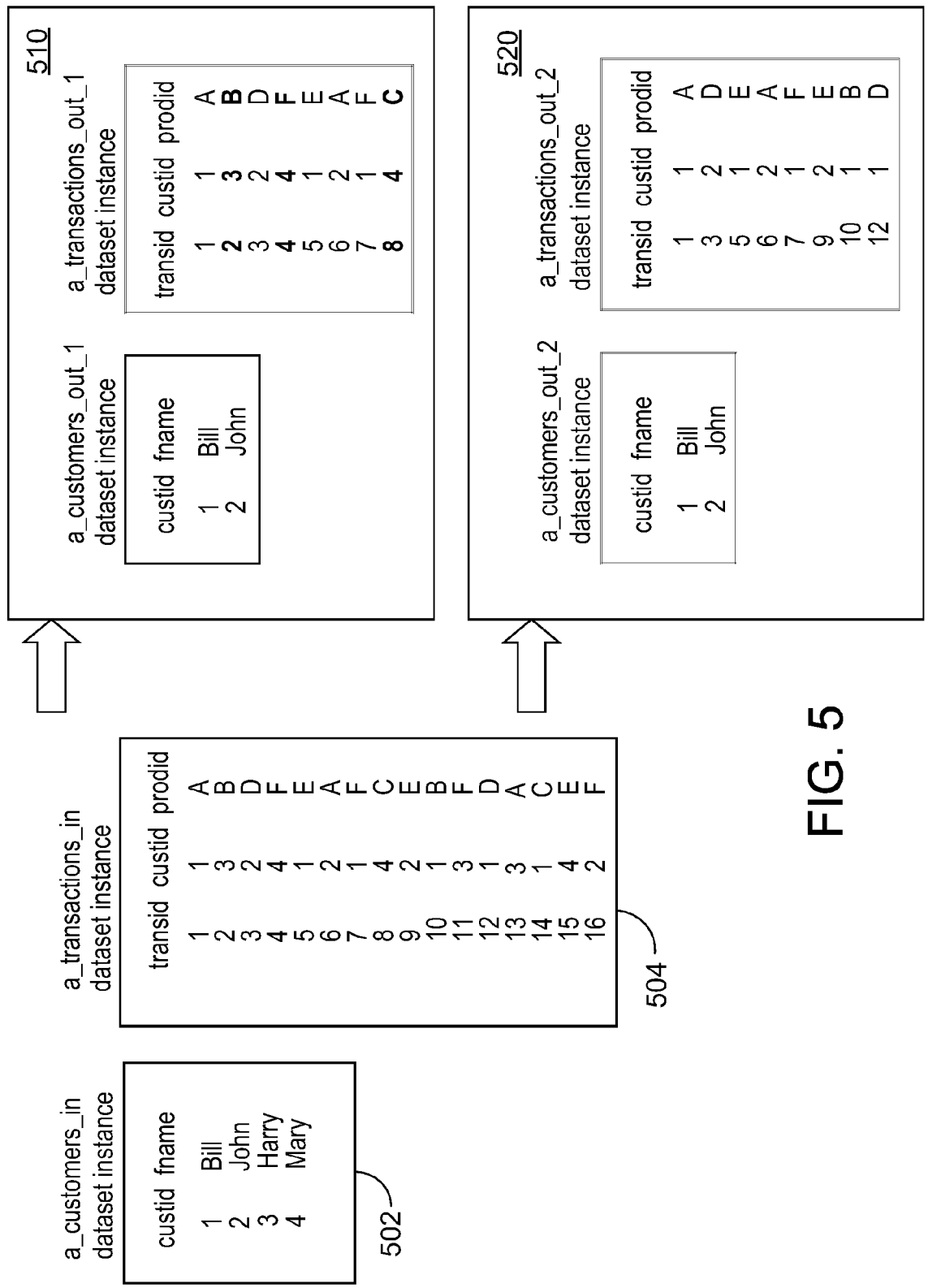
FIG. 5 is a diagram illustrating transformations applied to datasets.

One typical operation suitable for a production is to reduce the size of a collection of dataset instances, while not destroying the inherent properties such as dependencies (e.g., foreign key/primary key relationships) and equivalences (e.g., associations between fields that represent the same entity) among elements of each dataset. For example, referring to the ab_conspec in FIG. 4A, one may want to cut the number of a_customers in a particular instance in half, along with cutting the number of a_transactions in another instance in half, as well. However, if one were to cut each dataset instance by arbitrarily removing the first 50% or records, one would likely end up with transactions that referred to customers that didn't exist in the processed customers dataset instance. FIG. 5 illustrates the effects of arbitrarily cutting dataset instances without regards to maintaining referential integrity.

In order to process dataset instances in a manner that preserves the properties (e.g., dependencies among dataset elements and equivalences among dataset elements) defined in the conspec shown in FIG. 4A, one may utilize a production processor including a generic set of processing graphs that operate sequentially on multiple dataset instances so as to preserve these properties while each dataset instance is processed.

In this example, the desired manner of reducing a_customers and a_transactions may be to determine that customers should be processed first, since transactions make references to them. Furthermore, once customers have been reduced by 50%, transactions should be inner joined with the already processed customers, so as to only select transactions that match the remaining customers. Once transactions have been filtered for the purposes of maintaining referential integrity, one may further filter transactions so as to maintain either 50% of the original number, or 50% of the already reduced number, which ever is defined in the production rules, and which may be possible. The referential integrity filter may cause all the transactions to be removed, thus making it impossible to further filter down to 50% of the original number.

FIG. 5 illustrates the effects of reducing a_customers and a_transactions while maintaining referential integrity among dataset instances, as defined in the conspec ab_conspec. In this example, a user may specify a rule such as "reduce records by 50%", and expect a production processor to maintain the various properties declared in a referenced conspec. This is a comparison of two different ways of handling a transform (a 50% reduction) applied to multiple related dataset instances, where the top method fails to maintain referential integrity, and where the second method maintains referential integrity. One result 510 applied to the original dataset instances 502, 504 represents a result after arbitrarily cutting each dataset instance by 50%. The bold transactions highlight erroneous references to non-existent customers. Another result 520 represents a result after cutting customers by 50%, then filtering out transactions to maintain referential integrity, and then filtering this set in order to retain 50% of the original.

Figure 6:
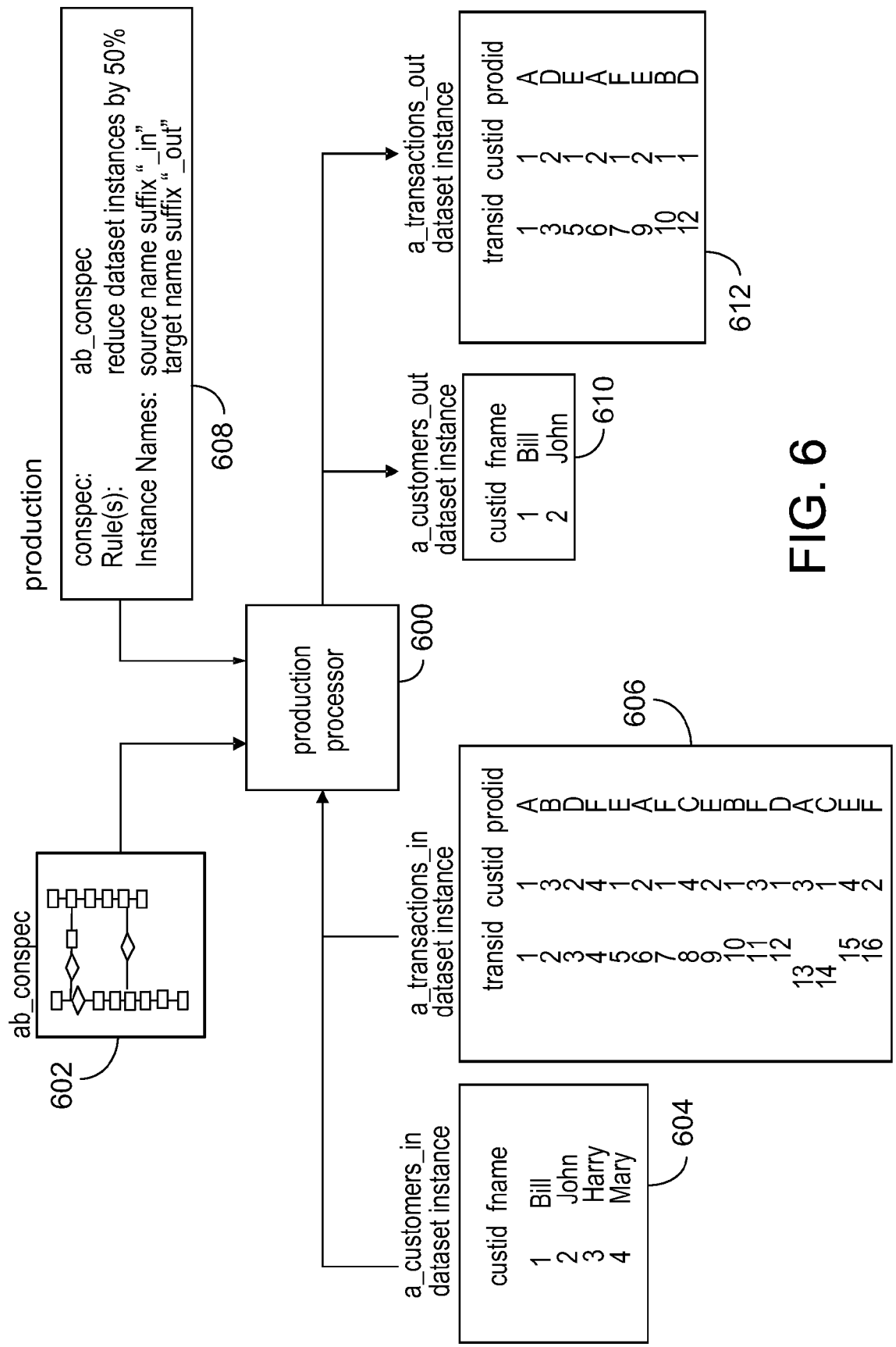
FIG. 6 is a block diagram illustrating operation of a production processor.

FIG. 6 illustrates how a production processor 600 may read in a production that identifies a conspec 602, then read in the identified conspec, then read in a collection of dataset instances 604, 606 according to a set of unique identified names (here the production simply provides a unique name suffix), followed by processing the dataset instances according to rules defined in the production 608, followed by writing a new set of dataset instances 610, 612 according to target names also defined in the production. Generally, FIG. 6 represents an operation of a production processor that reads dataset instances with a given name suffix, reduces records according to production rule(s), maintains conspec properties (i.e. referential integrity), and writes results to target dataset instances using given name suffix.

A role of the production processor is to inject the rules specified in a production into one or more generic and configurable graphs containing sufficient "parent join" and "filter" transforms, such that the datasets are processed along with the production rules, without necessitating the user to code special purpose graphs in order to maintain referential integrity and other properties declared in the conspec.

The basic principle of the generic production run graph (i.e. prod_run) is to enable each dataset instance being processed to have access to all the preceding dataset instances that have already been processed in a run of the production processor. The prod_run graph may contain a generic join that links a dataset instance with the other dataset instances previously processed. The job of the production processor as a whole is thus, to determine the processing order for the involved dataset instances, and to write the parameters for each dataset that configure the prod_run graph.

In this example, the production processor may first determine that a_customers need to be processed and that they have no parents, and then that a_transactions need to be processed, and that the parent or preceding dataset is a_customers. Note, in some cases a predecessor may not be a parent from a foreign-primary key point of view, but may just be a dataset that was processed first, and therefore, may be of some use to a subsequent dataset that may have an equivalence property relating one or more of its fields with those of the predecessor.

In the basic case, a production processor may thus determine that the processing order is a vector of dataset names of the form [vector a_customers, a_transactions], and that the parameters for processing the a_customers dataset instance are: dataset_name:a_customers, parents:[vector], and that the parameters for processing a_transactions are: dataset_name: a_transactions, parents:[vector a_customers].

The following example describes the tasks of deriving the processing order and various parameters used by a production run graph, along with a number of the tasks performed by the prod_run graph to process each dataset instance.

A conspec data structure is a standalone representation of the metadata describing a set of datasets and their constraints based on various types of relationships between their fields. In some implementations, a conspec enables a pre-processing graph to read and navigate the constraints among a set of datasets in a standard manner using a set of common DML functions. A pre-processing graph is able to generate configuration parameters that drive the operation of downstream dataflow graphs. As such, pre-processing graphs typically read in instructional information, rather than record sets, and produce sets of parameters, called "parameter sets" (or "psets") that feed into downstream graphs and plans. The parameters in a parameter set are used to provide metadata to and configure functionality of the components in the dataflow graph.

To get an idea of how a conspec may be used in conjunction with a pre-processing graph, we'll take the example of filtering a collection of datasets while maintaining referential integrity among primary and foreign keys.

In this example, suppose there were two datasets representing customers and transactions. In the transactions dataset, consider that one of the fields is a foreign key that references the customer id, which is the primary key in the customer dataset. The goal of the filtering operation is to remove records from both the customer and transaction datasets, but maintain referential integrity between the two, such that there are no resulting transaction records that reference customer identifiers (IDs) of customer records that have been filtered out.

In order to perform this filtering operation correctly, the system is capable of determining a processing order and maintaining certain constraints that are a function of that order. For example, the processor may decide to process customers first, and then filter transactions, such that no transactions are included that reference already removed customers. Alternatively, the processor may decide to filter transactions first, but then process customers such that no customers are removed that are referenced by transactions that were selected.

The job of a pre-processing graph in this example is to determine the processing order of the datasets, and to write the rules that govern the behavior of the graph processing each dataset. A conspec provides a pre-processing graph with the information it needs to perform these generative tasks.

The content of a conspec goes beyond that of a DML record format, which describes the contained fields within a single dataset. Here we're talking about the relationships and associations among collections of fields in related, but distinct datasets. This includes definitions of ordered groups of fields (i.e. keys), as well as key-to-key relationships such as primary-foreign key relations, and joins involving sort keys among N datasets.

A conspec may be implemented as a set of record-based files. In this form, a graph could read these files and instantiate an in-memory vector-based representation of a conspec for use in DML functions. In another representation, a conspec may take the form of an annotated DML package file. The file would contain the DML record formats for each of the datasets, along with a set of comments to define the keys, key element members, relationships and associations. This kind of representation would be human readable and editable.

The system includes a DML function library that reads a serialized conspec and instantiates a collection of vectors. The library includes a set of functions for traversing the relationships in the conspec, as well as writing to the conspec. The following DML transform code from a pre-processing graph shows a call to load a conspec from a file, and a function that takes a conspec and a dataset name as arguments, and produces a SQL select statement for looking up the Max and Min key values of the primary key elements. The conspec DML library provides functions for obtaining the elements associated with primary keys of a specified dataset. Exemplary DML functions are shown in FIGS. 16 and 17A-17I.

Referring back to FIG. 4A, a diagram is shown depicting a conspec including five datasets, two primary-foreign key relations, and one 3-way join relation among a set of multi-field sort keys. The diagram was produced by a set of DML functions that read an in-memory representation of a conspec and write out a "graphviz" dot file suitable for rendering as a ".svg" file. The arrows serve dual purposes; they indicate from-to relations between foreign and primary keys, and they indicate key memberships in join associations.

For the case where a conspec is implemented as a set of record-based datasets, one may produce a conspec that describes the relationships among these datasets. This is essentially a conspec for representing conspecs.

Referring back to FIG. 4B, a conspec is shown that relates a collection of five datasets. The dataset named "dml_dataset" on the left is used to define a set of datasets. The "dml_dataelement" dataset in the top center is used to define elements in each of these datasets. The "dml_datakey" dataset defines the keys in each dataset. The "dml_datakeyelement" dataset defines key to element memberships. The remaining datasets define the relationships and associations among keys.

Conspecs can be represented in ways that are human readable. FIGS. 16 and 17A-17I show listings (portions of executable code) of an annotated DML package file that describes a conspec shown in FIG. 4A, consisting of a-customers, b-customers, their transactions and related consumer information. FIG. 16 shows a listing 1600 of a DML function that establishes a database query (e.g., an SQL query used with a database that supports SQL) that can be used with a conspec. In the listing 1702 shown in FIG. 17A, keys and field-to-key memberships are annotated to the right of the fields in the DML type definitions. The block of comments at the top encodes the relations and associations among keys. The listing 1704 shown in FIG. 17B shows an example of a conspec for conspecs.

Conspecs can be represented in a variety of ways. The following example uses certain terminology to describe the representations of a conspec. A conspec is a description of the structure and relationships among a set of datasets. A conspec instance is the collection of dataset instances of the datasets referenced in a conspec. A dataset instance is a particular dataset (such as a collection of records, usually supplied in a file or database table).

A conspec may be stored as an annotated package file, or as a collection of records following a number of different record formats. In some implementations, a conspec is stored as a collection of lookup files. The structure and relationships among these lookup files can be described using a conspec, as illustrated by the conspec for conspecs of FIG. 4B.

Given these two serializeable representations of conspecs (e.g., an annotated package file, or a collection of lookup files (i.e. a conspec instance)), an in-memory DML representation of a conspec can be implemented that can be navigated and modified by a collection of DML functions. This in-memory representation can take the form of the listing 1706 shown in FIG. 17C.

This allows development of a DML function library that makes it possible to parse the DML package file representation of a conspec, find a dataset by name, and then retrieve the foreign keys for that dataset, as shown by the listing 1708 shown in FIG. 17D.

The operations of subsetting, masking, and expansion are all processes that one may apply to a collection of datasets and their associated conspec. One may think of these operations as conspec productions. A production is a collection of rules associated with a conspec that include the location and identities of source dataset instances, and the desired locations and identities of the target dataset instances. Here, a dataset instance refers to the actual data of a dataset described in a conspec.

Unlike a conspec, which defines the structure and relationships among a set of datasets, a production defines a set of rules for processing a collection of dataset instances (e.g., files, db tables, etc.) whose fields follow the constraints defined by some conspec.

Because a conspec defines constraints such as dependencies among records in datasets, any kind of production that processes data in a collection of dataset instances does so in an order that respects the dependencies by using the conspec. For example, a production that calls for filtering out customers does this operation first, and then filters out records from dependent dataset instances (such as transactions). Alternatively, if there were a production that created new customers and transactions, then the system would create new records in the customer dataset instance first and then wire up new records in the transaction dataset instance to reference the new customers. If customers existed already, then the system could presumably wire up new transactions to existing customers without creating new customers. In either case, the dependencies in the conspec imply a processing order of parents to children that can be respected to substantially maintain referential integrity, depending upon the nature of the production rules.

In order to support wiring of productions together, the generic processor assigns IDs to new records by using a signature that is unique to the production. This ensures that an ID assigned by one production won't conflict with an ID assigned in a next production. A more detailed discussion of this follows in the section on primary key assignment.

Figure 7:
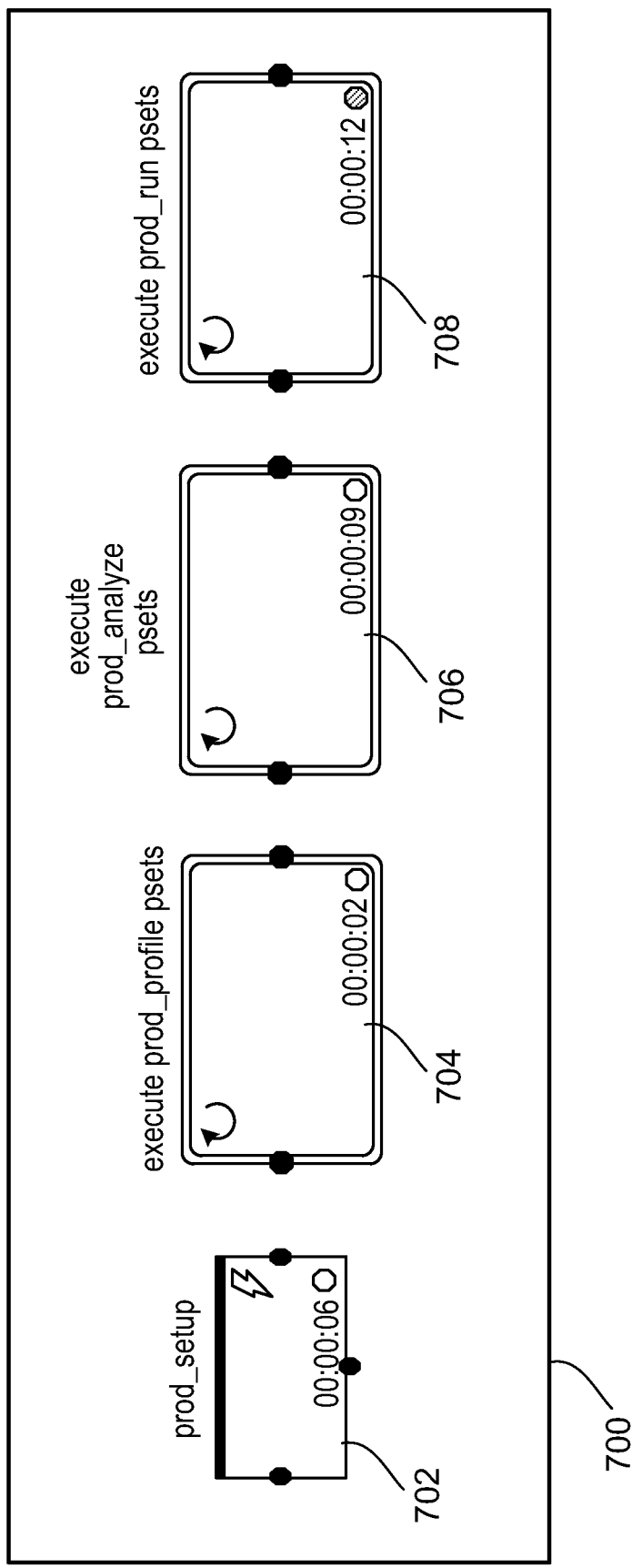
FIG. 7 is a schematic diagram of a plan for scheduling tasks to perform data processing.

FIG. 7 shows a plan 700 that is able to perform the tasks of a production processor. A plan is a directed graph whose nodes represent tasks to be performed, and whose links represent an order in which the tasks are invoked. The plan 700 operates by invoking a prod_setup graph and then loops through execution of prod_profile, and prod_run psets for each dataset in the processing order, and prod_analyze psets for each dependency and equivalence property defined in the conspec.

Figure 8:
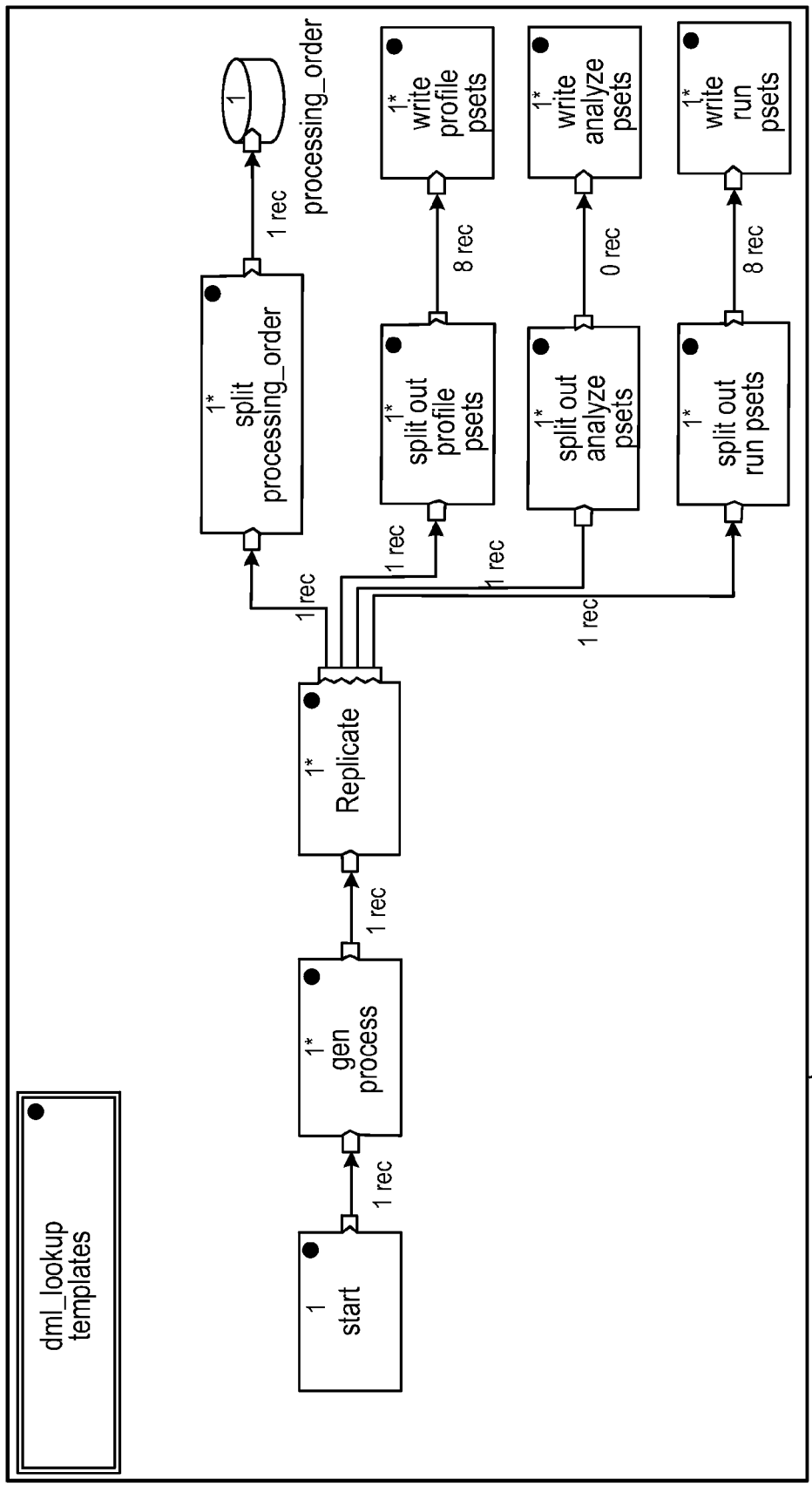
FIG. 8 is a schematic diagram of a dataflow graph.

The plan begins by executing a graph 702 called prod_setup, which is responsible for generating the processing order of dataset instances in the conspec, along with the parameter sets required to profile, analyze, and process each dataset instance named in the processing order according to the rules of the production. The prod_setup graph 702 generates processing order, prod_profile, prod_analysis, and prod_run psets and is shown in further detail in FIG. 8.

The second step 704 of the production processor represented by the plan 700 shown in FIG. 7 is to loop through execution of dataflow graphs (configured by psets) used to profile each of the datasets in the processing order. Any of a variety of techniques can be used to profile a dataset using dataflow graphs (e.g., as described in U.S. Publication No. 2005/0114369 incorporated herein by reference). Profiling may be required in cases where a production may call for unloading and updating records from and to a database, and where it is important to know the start and end index values of the primary keys in the database before making any uploads. This is relevant in cases where a production may call for expanding, or copying records. When a record is copied, it needs to be assigned a new primary key value for each primary key member, and thus, the production processor may use the knowledge of the existing key values used by the database to ensure that new values are selected that do not interfere with the values already existing in the database. The profiling stage of processing may generate a Min and Max value for each of the primary key indices for each dataset named in the processing order. The profiling graph may write the Min and Max values for each dataset instance to a file for use by subsequent graphs used to process individual datasets. In a simple case, the prod_run graph may copy a record to create N new ones, and assign new primary key values in range blocks spanning the difference between Max and Min values, thus ensuring that new records uploaded to the database will not conflict with values already existing in the database.

The third step 706 of the production processor represented by the plan 700 shown in FIG. 7 is to analyze each of the dependency and equivalence properties of defined in the conspec. In the example of the ab_conspec shown in FIG. 4A, a join association defines an equivalence property among 3 datasets, a_customers, b_customers, and consumer_info. In this step, the production processor analyzes this property by reading each of the dataset instances and performing an outer join. The overlap results of the outer join are aggregated and written to a distribution analysis file for use by the prod_run graph to perform filtering. Details of this step are covered in the discussion of FIGS. 10 and 11.

The fourth step 708 of the production processor represented by the plan 700 shown in FIG. 7 is to loop through the execution of dataflow graphs (configured by psets) used to process each dataset instance. This step involves calling the graph prod_run, shown in FIG. 12A with sub-steps shown in subsequent FIGS. 12B-12F.

FIGS. 18A and 18B illustrate an example of logic 1802, 1804 that may be used by a production processor to generate the processing order from parents to children, given an initial seed set of datasets to consider, and a set of datasets to exclude from traversal and inclusion. Note, the seed and exclusion datasets may be passed in as rules as part of the production. A conspec may define a superset of all the datasets to be considered in inclusion for the processing order.

With reference to the ab_conspec containing a_customers, b_customers, a_transactions, etc, one may choose to exclude a_transactions. In this case, the processing order would start with a_customers, but not include a_transactions. Likewise, if a user chose to not include a_customers in the list of sources, then neither a_customers nor a_transactions would be included in the processing order.

FIGS. 18A and 18B present the logic 1802, 1804 in the form of pseudo code to look like programming functions. The main function of logic 1802 begins by initializing an empty processing_order vector and then calling a function to populate the processing_order. This function writes into the processing_order vector until the task is complete.

The main function uses a gen_processing_order function to loop through each dataset in the named sources, and for each one, derive a vector of the dataset and all its children recursively. It then adds the results to an all_results vector, making sure that there are no duplicate values. Order is not important at this point, just inclusion of all the children recursively.

Once gen_processing_order has derived the list of all the participating datasets, it proceeds to determine the highest level parent, (i.e. the one which has no parents that are also included in the set of all_results. A function that determines this is update_processing_order. This function operates recursively by walking up parents until the highest level parent has been reached in the set of all_results, and then dumps this highest parent dataset into the processing_order vector. Then, the remaining datasets are processed, again recursively walking up to find the highest level remaining parent until it can be dumped into the processing_order vector next in sequence.

The function get_dataset_and_its_children_recursively serves as the lead off function that calls a recursive function to operate on immediate children and then call itself. The top level function here calls the get_dataset_and_its_children with an initially empty vector of what will become the list of all children recursively. This function get_dataset_and_its_children works on the immediate children of a source dataset, and calls on itself, passing the vector of accumulating datasets down in its recursive calls.

The overall process involves first obtaining children recursively to obtain the set of all all_results. However, the process finishes by obtaining the parents recursively from this set of all_sources.

Figure 9A:
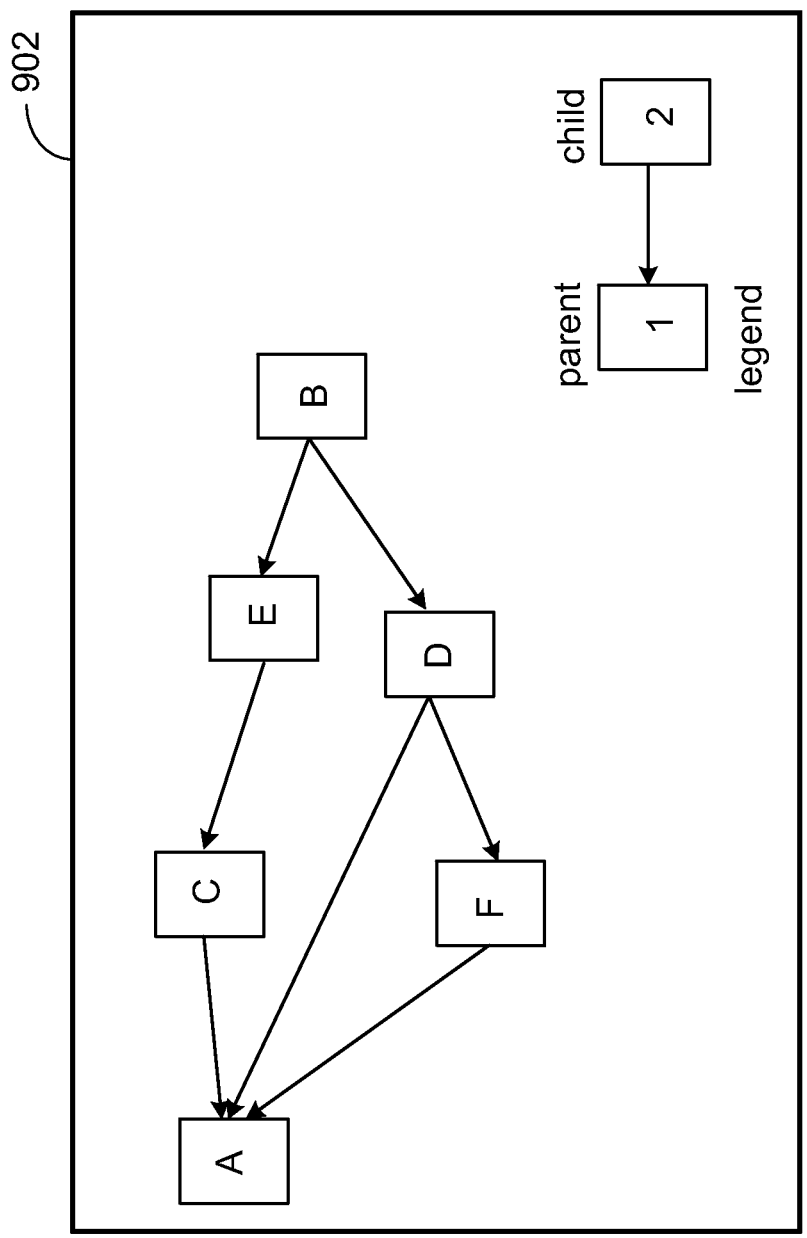
FIG. 9A is a block diagram illustrating selection of a dataset processing order.
Figure 9B:
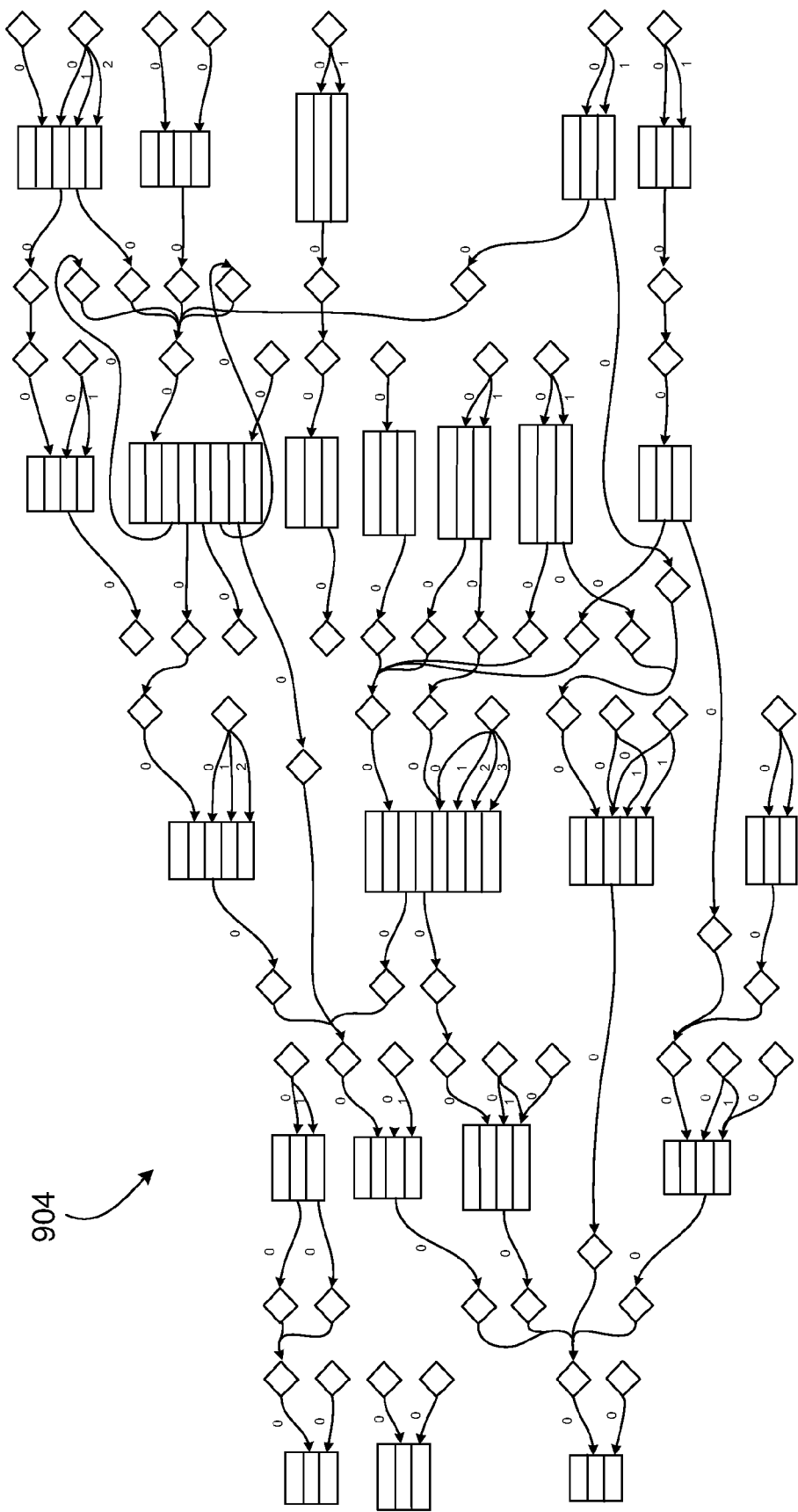
FIG. 9B is a schematic diagram of a conspec data structure.

FIGS. 9A and 9B show examples of processing orders using this logic, and the accompanying conspecs used to derive the orders. FIG. 9A is an example of a processing order 902 that ensures all parents are processed before children are processed. The processing order shown is A, C, F, E, D, B. FIG. 9B shows a complex conspec 904 illustrating a processing order that ensures all parents are processed before children are processed. The processing order shown is OpJobDefinition, JobDefinitionPropertyValue, OpTimeConstraint, OpDay, OpJobDefinitionDependency, OpFileAndEventConstraint, OpJobDefinitionAction, OpJobDefinitionActionArgument. Other embodiments of logic to generate processing orders may involve determining a child to parent order.

The prod_analyze step 706 from FIG. 7 is where each dependency and equivalence property in a conspec may be analyzed with respect to the set of dataset instances identified in a production. Each collection of dataset instances associated with a conspec may exhibit different distributions of overlap for each property. For example, with a dependency property such as the one between a_customers and a_transactions, there may be a large number of transactions associated with a relatively few number of customers for a certain set of instances. However, in another set of instances, there may be relatively few transactions for each customer, but a more even distribution over all customers. Knowing the characteristics of such a dependency property may be useful in determining which records to keep in a source dataset instance when comparing it to an already filtered predecessor dataset instance.

Similar to dependency properties, equivalence properties define key-to-key equivalences between datasets. However, differing from dependency properties, equivalence properties may be considered many-to-many, as opposed to from-to. For example, in the ab_conspec (FIG. 4A), the join1 equivalence is defined to include 3 datasets. Each of these datasets has keys that may be considered equivalent to the keys in the other datasets. The equivalence does not imply that the presence of a record in one dataset must mandate the presence of a record in another dataset, as it would with a dependency property, but rather, that if two records from participating datasets share the same key value, then they have the same meaning and are equivalent.

Figure 10:
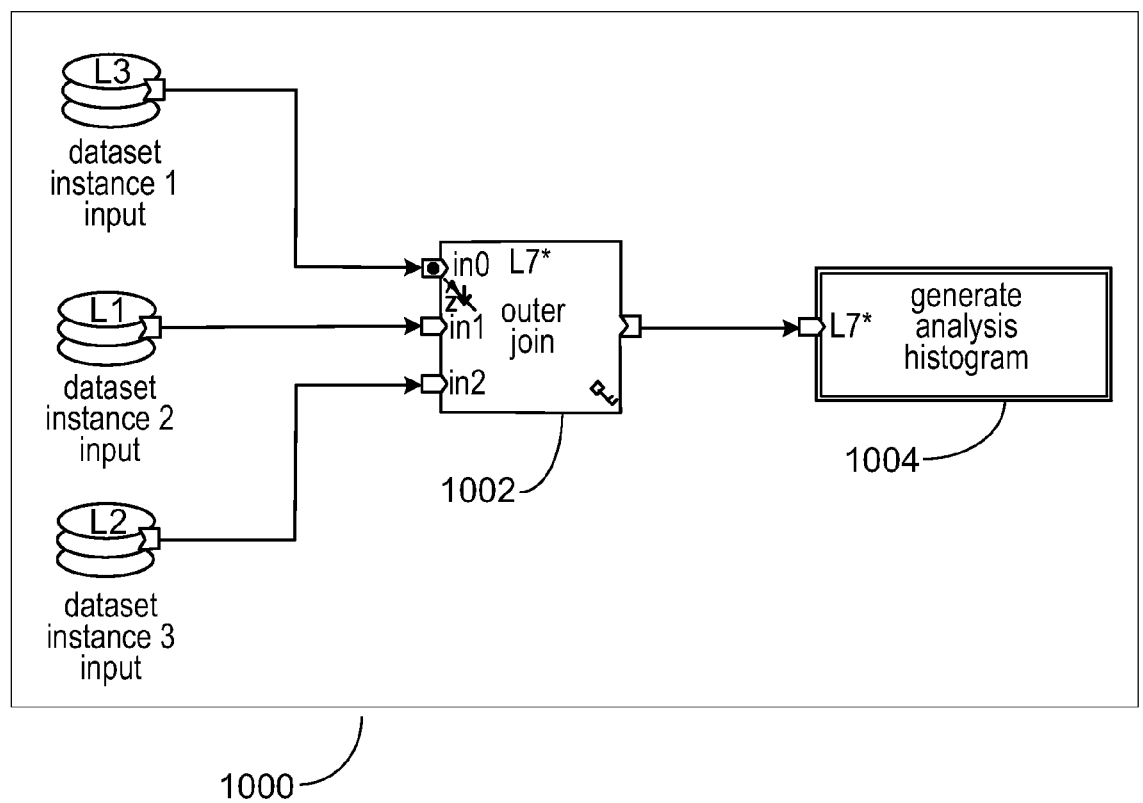
FIG. 10 is a schematic diagram of a dataflow graph.
Figure 11:
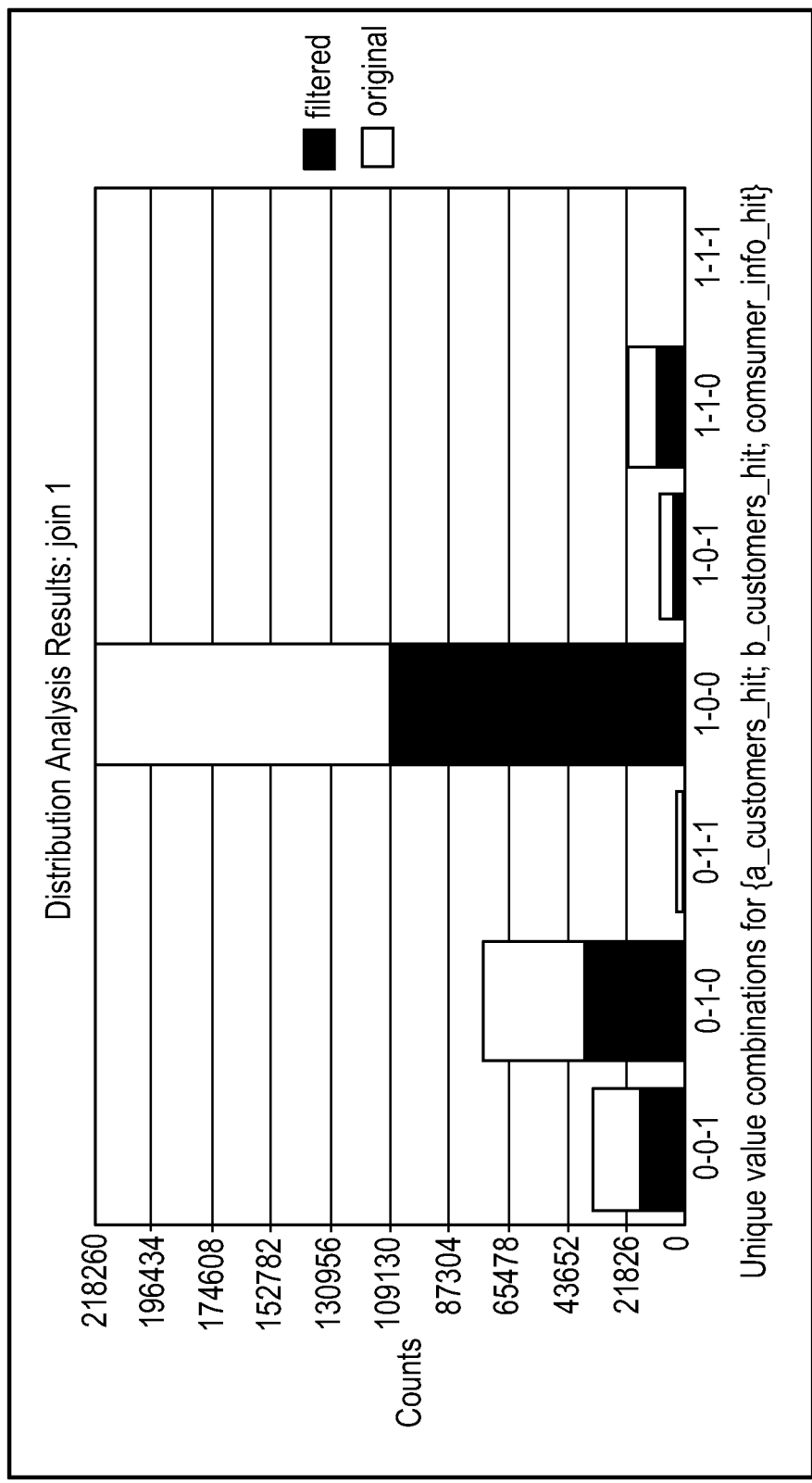
FIG. 11 is a plot illustrating a histogram.

FIGS. 10 and 11 show the processing steps and results for analyzing an equivalence property (e.g., performed as part of the third step 706 of the production processor represented by the plan 700 shown in FIG. 7). FIG. 10 shows the configuration of an "up-to-3-way" join analyzer. In particular, this is a prod_analyze graph 1000 used to analyze join dependency and equivalence properties defined in the conspec. The result is outer join overlap data for the participating dataset instances, and a distribution histogram.

In another embodiment, this mechanism may support up to N simultaneous joins, and be configurable to support a varying number of dataset instances, as defined for an equivalence property in a conspec.

The outer join 1002 in the process may be configured to sort each input dataset on its respective key element members. The prod_setup graph may, furthermore, have already written parameters into the pset feeding the prod_analyze graph, indicating each of the sort keys for each of the dataset instances. In the example of the ab_conspec, the a_customers, b_customers, and consumer_info datasets all have keys whose members are: {place; building_num}, however, the key members may be different for each dataset instance.

The outer join 1002 serves to link up record hits from each dataset instance, and then compute a hash value for the key values which may uniquely identify an occurrence of a key value combination with the hit status of the participating dataset instances. For example, if one key value combination were place="foo" and building_num="bar", then this would generate an aggregate_value hash of say "12345" and the output record would include the hit status of each dataset; in other words, did source_dataset_1 have that value and so forth.

The listing 1710 shown in FIG. 17E is an example of a function that may be used to tally up the aggregate hash value and hit status for the participating dataset instances.

The prod_setup graph 702 may generate this transform and pass it as a parameter value within the pset targeting the prod_analyze graph (e.g., the step 706 shown in FIG. 7). This parameter value may accompany the set of generated key parameter values for each of the participating datasets.

A generate analysis histogram step 1004 takes the output of the outer join 1002, and performs an aggregation of the hit results. The stream of output records indicates unique aggregate_values (i.e. unique combinations of key values from the outer join) from the outer join. This stream of records may then be sorted by the hit fields: source_1_hit . . . source_

N_hit, be fed into a scan and rollup component. At this point, each record indicates a unique aggregate value for the keys in the outer join, in addition to a hit status of whether each dataset source participated in having that key value combination. By sorting the records by the hit fields, and passing them into a scan and rollup, the system is able to determine the running count and total count for the combination of hit statuses found in each record. So, for example, if the first record had an aggregate value of place="foo" and building_num="bar", then the scan/rollup would look at the combination hits (1, 0, 1), indicating that both datasets 1 and 3 participated in having that combination of key values. The component would also look to see that this was the first occurrence of this combination of hits, and assign a running count of 1 and a total count of 1 to this record. If the second aggregate value record came along with a different combination of hits, it would also get assigned a running count of 1 and a total count of 1. If the third aggregate value record came along with the same combination of hits as the first record, then it would get assigned a running count of 2 and a total count of 2.

The result of this process is a set of records (called join analysis records) that represent the unique key value combinations for the outer join 1002. For each record, the system may also know which source dataset instances participated in the join, and what running count each record represented having this combination of hits, as well as what total count of records occurred with this combination of hits. This information may be useful to downstream operations performed in the prod_run graph. For example, the prod_run graph may be configured to join one of the dataset instances associated with this join analysis, with the join results. The join may be performed by using the aggregate value key from the analysis results, joined with a corresponding computed value using the participating key element values in the source dataset instance. The join will indicate for each record of the source dataset whether a record with similar key values occurred in any of the other dataset instances participating in the equivalence property (e.g., an association) defined in the conspec.

FIG. 11 shows the charted histogram results 1100 for a collection of dataset instances defined in a production associated with the ab_conspec. This is a prod_analyze distribution histogram showing the number of records from participating dataset instances defined in a dependency or equivalence join that overlapped. A '1' indicates that a dataset instance had records in that group. A group is a collection of records that have matching values on the join key. This example shows the results from the a_customers, b_customers, consumer_info join defined in the ab_conspec from FIG. 4A.

These results 1100 are the result of the production analysis process (e.g., the prod_analyze step 706 from FIG. 7) being applied to the join1 association defined in the ab_conspec. One may see that the three datasets have large numbers of records that do not match any corresponding records from the other datasets. Only a few of the key value combinations have records from two or all three of the dataset instances. Thus, from these results, if one were to filter records from an a_customers dataset instance, and desire to maintain the a distribution of hit combinations with the other two dataset instances associated with the production/conspec, one would have to be careful to include records whose key values fell in the 1-0-1 and 1-1-0 groups. In other words, if one were to carelessly select records from a_customers without using these results, it would be easy to drop most or all of the records that had matching records in b_customers and consumer_info. Such a careless selection of records from a_customers would break the outer join distribution characteristics exhibited by the join property defined in the conspec, and the specific values exhibited by the dataset instances identified in the production.

Figure 12A:
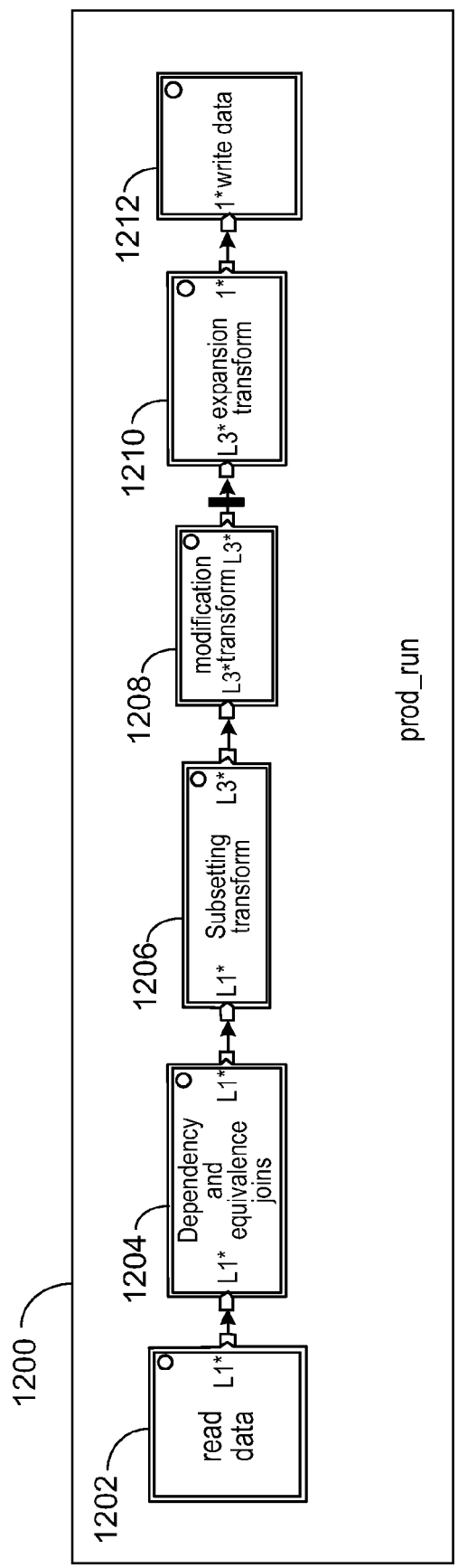
FIGS. 12A-12F are schematic diagrams of dataflow graphs.

Once the prod_analyze graph (e.g., the prod_analyze step 706 from FIG. 7) has generated analysis results for each of the equivalence properties (e.g., associations between fields whose values have an equivalent meaning) defined in the conspec, the production processor plan 700 shown in FIG. 7 may invoke the prod_run graph (e.g., step 708) for each pset associated with each dataset instance identified in the processing order. FIG. 12A shows the steps involved in processing a dataset instance using the collection of input values supplied by a pset. The steps are represented as components of a prod_run graph 1200, which is executed for each dataset instance in the processing order.

The first step 1202 of the example in FIG. 12A is to load an input "source" dataset instance according to the naming convention supplied for each dataset instance in the production. The name and origination of a dataset instance may be supplied to the prod_run graph as one of its pset parameters. A dataset instance need not originate in a file. Alternatively, a dataset instance may be unloaded from a database table using a SQL statement supplied as inputs in the production. Any potential source of data may serve as a dataset instance, such as a web service, a snapshot of data from a continuous flow, a database, a flat file, or another source of data. A production provides sufficient information to the production processor to locate and load each of the different types of dataset instance via parameters that are read from the production and written into the prod_run pset. The prod_setup graph extracts the information for the location of each dataset instance from the production, and writes this data as input parameters to the pset supplying the prod_run graph.

Figure 12B:
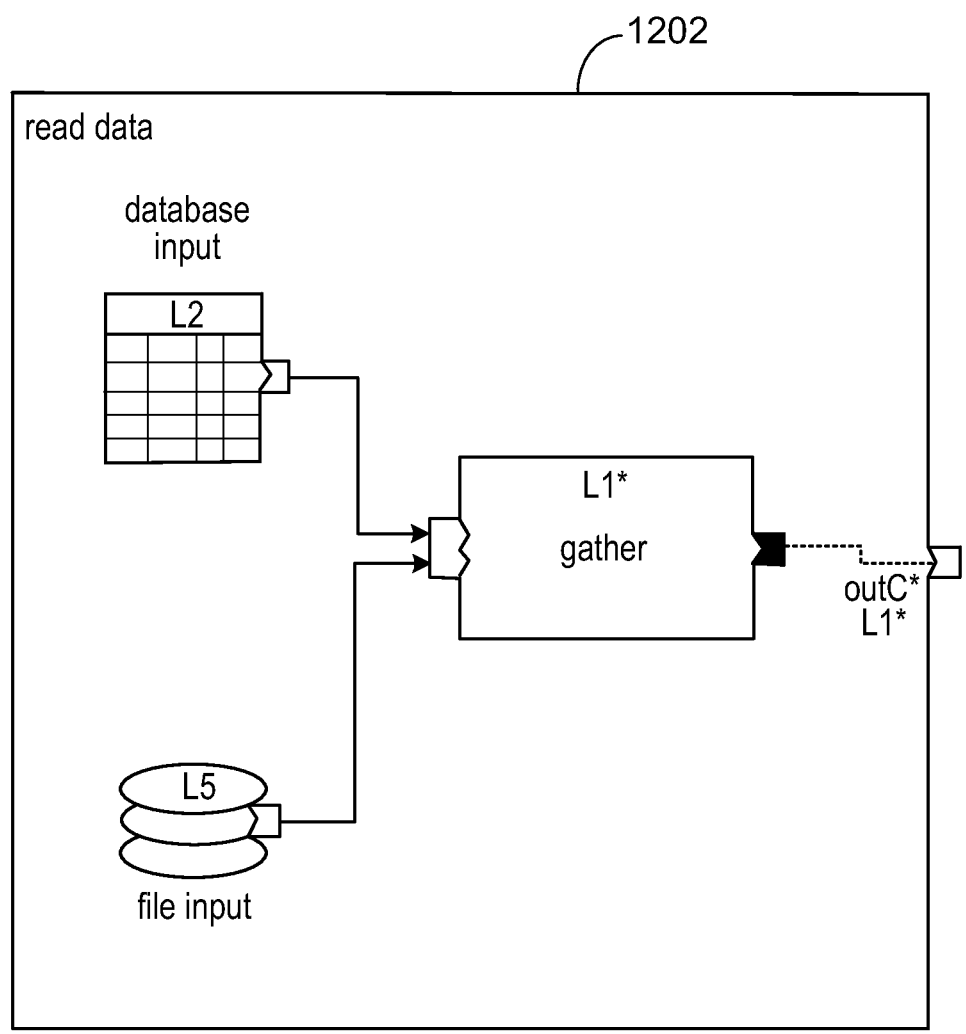

FIG. 12B shows details of the read data step 1202 of the prod_run graph 1200. This example is a loading flow including either a database table or a flat file. A more compete load component may allow a dataset instance to be loaded from other types of source. Furthermore, each dataset instance identified in a conspec may have a different representation and location from the others. In other words, a production may instruct the production processor to load a first dataset instance from a flat file, and a second dataset instance from a database table. Additionally, a first production associated with conspec A may call for loading an instance of dataset 1 from a file, while a second production associated with same said conspec A may call for loading a different instance of dataset 1 from a different source, such as a database table.

Referring back to FIG. 12A, once a dataset instance has been loaded by the prod_run graph 1200, a second processing step 1204 performs one or more join operations against each of the dependency and equivalence join results produced by the prod_analyze graph (e.g., step 706 of FIG. 7). In the case of a_customers (e.g., as shown in FIG. 4A), there may be a join performed against the join1 analysis results described herein, thus enabling the prod_run graph 1200 to identify records from a_customers that shared equivalent records in b_customers and consumer_info. The prod_run graph 1200 may then include and exclude a desired percentage of records from the a_customers dataset instance, so as to maintain the same overlap with records from previously processed b_customers or consumer_info dataset instances.

As an alternative to joining a source dataset instance with one or more join analysis result sets from the prod_analyze process, the prod_run graph 1200 may join directly with already processed parent dataset instances. The prod_run graph 1200 may then perform inner joins and simply remove source dataset records that have no corresponding match (e.g., based on the dependency property defined in the conspec).

One of the functions of the production processor (e.g., production processor 600 shown in FIG. 6) is to write out the processed dataset instances for each dataset in the processing order, and "wire up" these processed instances so that they may be joined with subsequent dataset instances as they are processed. In addition, a second function of the production processor is to analyze dependency and equivalence properties identified in the conspec, and write these histogram results describing inner and outer join characteristics of the subject dataset instances. Furthermore, a third function of the production processor is to "wire up" joins between these histogram results and each source dataset instance, so as to enable the prod_run graph 1200 to identify records that may share equivalent or dependent records in the already processed dataset instances.

The term "wire up" refers to the practice of the prod_setup graph (e.g., the graph 702 shown in FIG. 7) writing out specific parameter values to the prod_run psets for each dataset in the processing order. These specific values identify the names of the processed dataset instances, and include the primary key values, defined by the dependency and equivalence properties of the conspec. These values allow a generic graph such as prod_run, to be dynamically configured to load and join against the already processed dataset instances.

During the step of performing a dependency join (e.g., step 1204), the prod_run graph 1200 loads zero or more of the output dataset instances from the preceding executions of the prod_run graph. The prod_setup graph 702 (FIG. 7) may have determined that N preceding dataset instances (i.e. parents in one embodiment) need to be loaded for a particular source dataset. The prod_setup graph 702 is able to write the locations of the corresponding output dataset instances as parameters in the input pset of the source dataset for the prod_run graph 1200. Additionally, the prod_setup graph 702 is able to write parameters to indicate how many preceding dataset instances may need to be loaded.

Figure 12C:
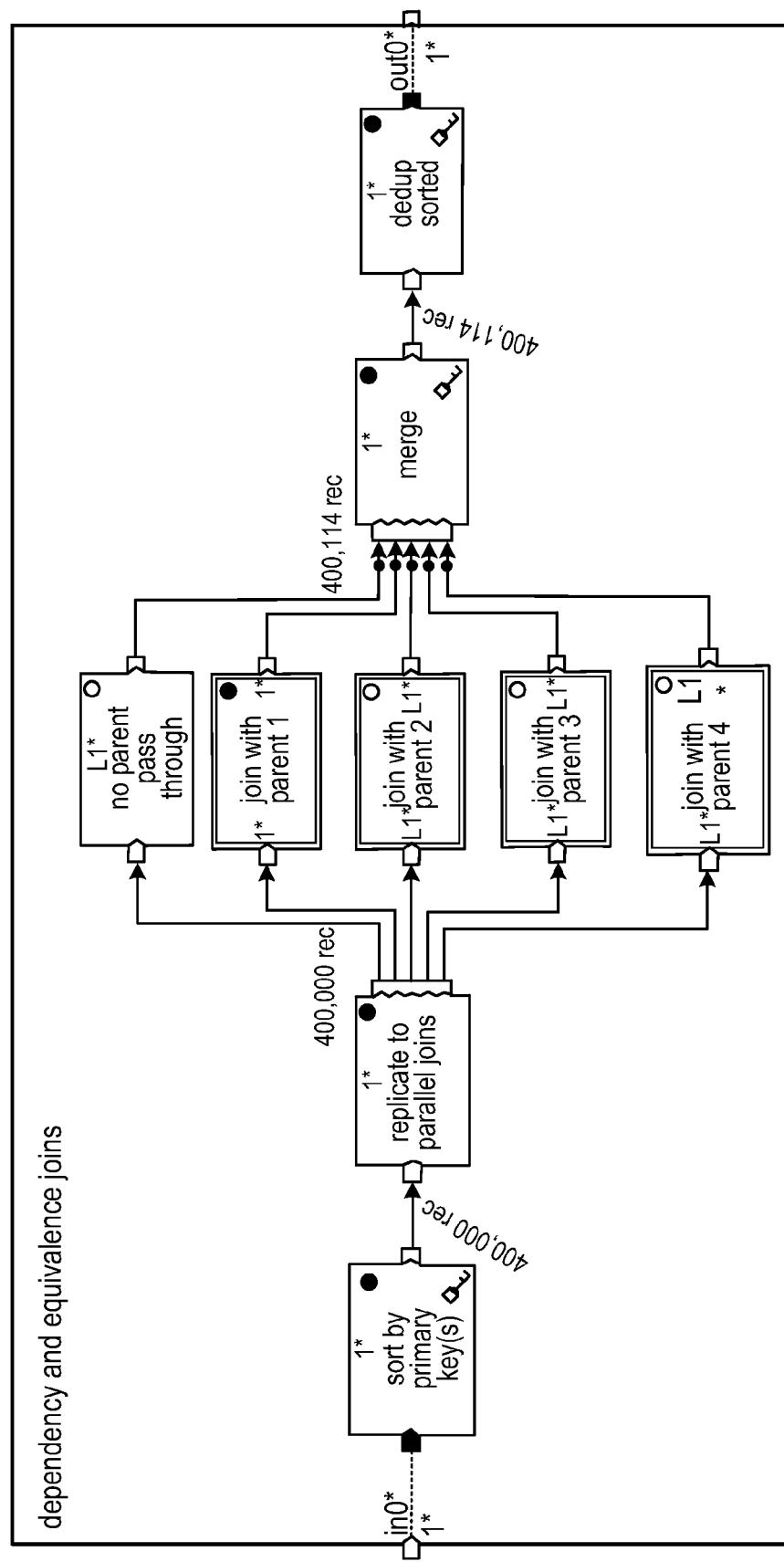

The second step 1204 in FIG. 12A, named dependency and equivalence joins, shows an embodiment of a join mechanism that may serve to load a variable number of predecessor dataset instances. Details of this step 1204 are shown in FIG. 12C. Depending upon the parameters supplied in the input pset, this mechanism may activate one join source for each predecessor dataset instance. The process may allow a source record to be selected if it successfully "inner joins" or matches a record from one or more of the corresponding predecessor dataset instances. In order to perform this join on each predecessor, the prod_run graph is given knowledge of the foreign key sort elements in the source dataset, and the corresponding primary key source elements in each predecessor dataset. This information is computed by the prod_setup graph, and be passed in as additional pset parameters to the prod_run graph.

This join step operates on a source dataset instance for the purpose of maintaining distributions of records that match or do not match other dataset instances that share dependency (i.e. relationship) and equivalence (i.e. association) properties, defined in the conspec. In this example, when a_transactions is considered as a source dataset, this join mechanism may ensure that records from the a_transactions dataset instance are removed that do not match records from the a_customers dataset instance that were already filtered out in a preceding operation of the prod_run graph. This is referred to as maintaining an "inner-join" property. In this example, this means that it is important to remove records from a_transactions that may not be valid given that certain referenced records from a_customers have already been removed.

In addition to filtering for dependency properties, this join mechanism may also filter for equivalence properties. An example of an equivalence property in the ab_conspec 400 of FIG. 4A is the join1 equivalence defined among a_customers, b_customers, and consumer_info. The distribution analysis that generated the histogram results 1100 shown in FIG. 11 may be used by this join step to maintain an even distribution of records for a source such as consumer_info relative to already processed dataset instances such as a_customers and b_customers. In other words, this join mechanism may ensure that the "outer join" characteristics among a set of peer-related dataset instances are maintained. So, if there were a high degree of overlap among records from the original a_customers and consumer_info, but a low degree of overlap among records from the original a_customers and b_customers, then this join may evaluate two already processed collections of b_customers and consumer_info, and filter a set of a_customers so that the results maintain a distribution similar to the originals. Generally, this is important when the processed datasets need to have the same kinds of overlap among them as the originals did.

One of the tasks of the production processor is to maintain distribution patterns exhibited by equivalence and dependency properties described in the conspec, all while performing transformations to records in various dataset instances, as prescribed by the collection of rules defined in a production.

With reference to the example of a_customers and a_transactions from the ab_conspec 400 shown in FIG. 4A, we may consider the case where the source dataset is a_transactions, and where the prod_setup graph 702 has previously determined that there is one predecessor to a_transactions—namely a_customers. The prod_setup graph may have written the foreign key elements for a_transactions—the ones that refer to a_customers—in the form of a sort key {custid}. Furthermore, the prod_setup graph may have written the primary key elements for the a_customers dataset in the form of a sort key {custid}. These different sort keys may have different values, as they may refer to different named elements from their corresponding datasets. Note, the information required by the prod_setup graph to determine the foreign key elements and corresponding primary key elements for a particular predecessor dataset may be found in the conspec that may be read in as part of the setup process of the production processor.

In order to perform the join and filter operations of a source dataset instance against one or more predecessor dataset instances, the prod_run graph 1200 may need sort keys for each. FIGS. 18C and 18D show examples of logic 1806, 1808 used to generate sort keys to serve as join links between a source dataset and its N predecessor datasets which share foreign to primary key dependencies—as outlined in the conspec. These functions may be implemented in the prod_setup graph 702 of the production processor (e.g., the production processor represented by the plan 700 shown in FIG. 7), and be called as part of the process of generating pset values for the prod_run graph 1200 for a source dataset.

The logic in these examples may use a supplied index number to identify the Nth dependency relationship between a source dataset and one of its predecessor datasets. In our a_customers and a_transactions example, there is only one dependency relationship from a_transactions to a_customers, and so this index will have only one value—0.

The first function, called get_fkey_sort_elements, starts by finding the parent datasets which have been included in the processing order vector derived by prod_setup. Next, the function uses these datasets to find the foreign keys in the source dataset that reference these parents. From the set of keys, the function obtains the Nth key, and extracts the key elements in the source dataset. The sequence order of these keys may be read and used to write out a multi-part sort key.

Similarly, a get_pkey_sort_elements function may be called to generate primary key sort elements in one of the parent datasets. The logic 1808 shown in FIG. 18D is an example of using the source dataset to look up the parent datasets that simultaneously occur in the processing order (these parent datasets may have already been processed). Given the parents, the function may look up the foreign keys in the source dataset, and select the foreign keys that point to the source parents. Given this set of foreign keys, the function may select the Nth key, and then find the corresponding primary key in the source parent. From this primary key, the function may find the sequence of key element members, and write out a multi-part sort key.

These two functions allow the prod_setup graph 1200 to cycle through the foreign keys of a source dataset, and generate groups of sort keys for each source and parent dataset pair. The prod setup graph may then write these key values out as parameters to the prod_run pset for ach source dataset.

The third, fourth, and fifth processing steps 1206, 1208, 1210 of the prod_run graph 1200 are used to apply custom transform rules supplied by a production. There are essentially three kinds of transform that may be applied to a dataset instance. One step 1206, subsetting, involves determining if a record from a source dataset instance should be eliminated. Another step 1208, modification, involves determining if a record from same said instance should be changed. Changes may involve adding or removing elements, and/or modifying values of elements. Another step 1210, expansion, involves determining if a record from same said instance should be copied to N new records, and for each new record, what the new values should be.

A single production may call for any of these types of transformation. These transforms may be applied in succession by a production processor. For example, a production may call for first subsetting a set of a_transactions in order to maintain statistical consistency as characterized by properties such as a frequency distribution over prodid and price elements, and then expand the subsetted results in order to copy remaining records, and "fan out" the new values to have different transaction dates. The term "fan out" refers to the practice of modifying the values of elements in N new copied records using a formula that distributes the new values over a range. So, in the case of fanning out a date, such as a transaction date, a production may prescribe to fan out the date by adding a M days to the date, where M is the index of the N copied new records.

A function of the production processor is to provide a generic mechanism for applying any combination of subset, modify, and expand transforms, as prescribed by a production. While each of these transforms may incorporate logic supplied by the production, each may also involve utilizing the results of preceding processed dataset instances.

A production processor may incorporate the results of prior processed dataset instances with production rule. For example, a production may call for copying of a_transactions, and fanning out transaction date fields. In this example, the production could associated with the ab_conspec 400 shown in FIG. 4A.

Expansion of a_transactions could depend on any of multiple factors. For example, the production may call for transforming a_customers as well as a_transactions. In one example, a_customers may be first expanded, such that for each customer, there are N new customers, with corresponding new and unique custid values for their primary keys. When a_transactions is expanded, at least two ways of handling the new a_transaction records may be possible. One way involves modifying each new a_transaction custid value to make a reference to one of the new a_customer records, while another way involves leaving each new a_transaction record to point to the same a_customer record that the original a_transaction record pointed to. Alternatively, had a_customers not been expanded, but rather, had been reduced, then the a_transaction records undergoing expansion would have had to be first subsetted in order to only reference included a_customer records, and then they could be expanded, leaving the custid values unchanged, so that they only referenced included a_customers.

The production processor handles the maintenance of referential integrity according to the dependency and equivalence properties defined in the conspec.

In some examples, a subsetting production can filter records through children recursively. For example, a simple production may comprise a single filtering rule to be applied to one of the datasets in a conspec. In addition, there may be an implied rule that the production also remove records from other dataset instances, leaving only the minimal set of records among all dataset instances that maintains referential integrity.

As an example, referring to the conspec 400 shown in FIG. 4A, a user may intend to keep only customers and transactions where the customer place field had a value of "Atlantic". The user would define a new production, associate it with the ab_demo conspec, and then express two filter rules, one on the a-customers dataset, and the other on the b-customers dataset. The rule would be a field-level constraint, indicating that place=="Atlantic".

In addition to providing a filter rule, the user might also specify a "global rule" requesting to keep the maximum set of records across all dataset instances in order to maintain referential integrity.

Finally, the user would specify the identities and locations of the dataset instance files, database tables, or other sources of data for each of the datasets defined in the conspec.

Given this production, a generic production processor would interpret both the conspec and the production rules, and first determine a processing order for the dataset instances. Since the filter rules are applied to datasets who have child datasets dependent upon them, the processor would first derive the processing order, beginning with the customer dataset instances.

The first portion of work that the generic processor needs to perform is the generation of the overall processing order, along with any transforms, joins, or other metadata that's needed by each dataset processing task. In this example, the processor needs to first operate on the customers, where customers have no parents to be joined with. However, the output of the customer processing needs to be saved and made available to the transaction processing steps, since each of the transaction records will need to be inner joined with the corresponding selected customers, so as to create a maximum set of transactions match exactly to the selected customers.

Once the first portion of the processing has generated the dataset processing order and all join logic, transforms, etc, the processor may hand off processing of each dataset instance by a graph within a looping sub-plan.

Figure 12D:
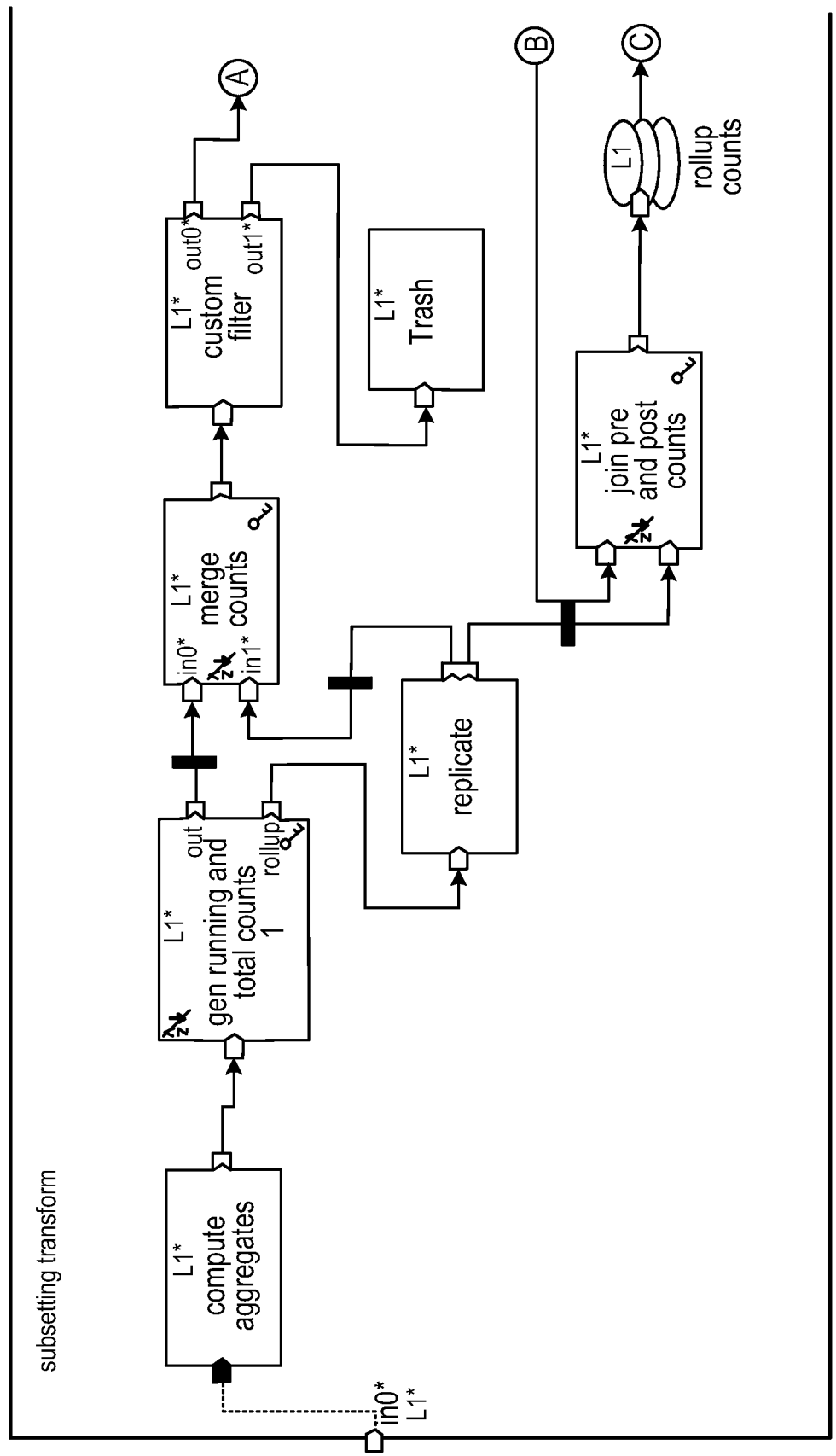
Figure 12D:
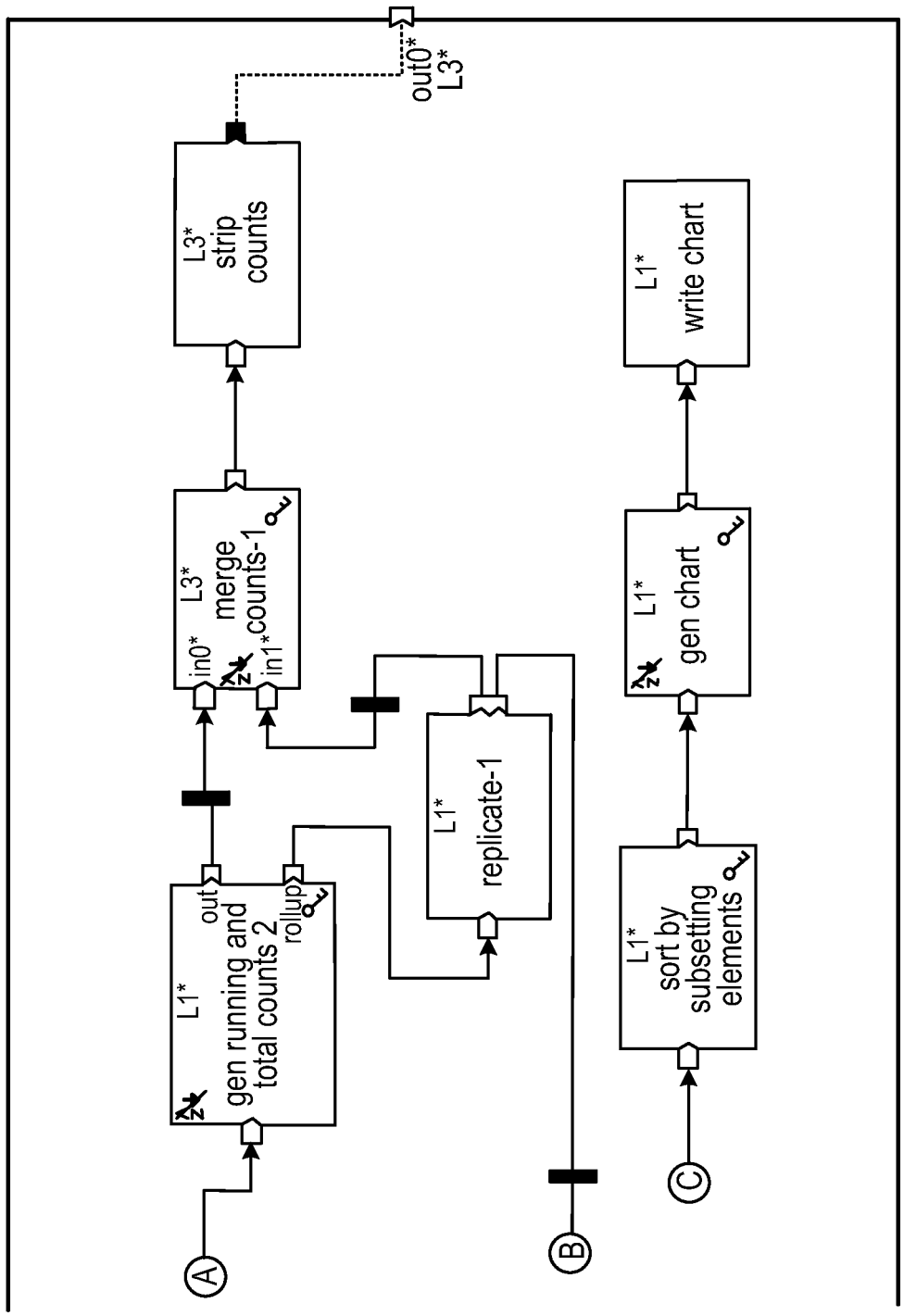

FIG. 12D illustrates one embodiment of a subsetting transform step 1206 that applies a transform function supplied as a parameter by the prod_setup graph 702. The filter may be of multiple types, including, but not limited to: single-record, and frequency-distribution.

With a single-record filter, only the values in each record may be used to select or eliminate the record. An example of this type of record is shown in the transform function shown in the listing 1712 shown in FIG. 17F, supplied as part of a production. In this example, records from the a_customers dataset are all selected, whereas records from the b_customers dataset are selected only if the "place" element begins with the letter "M". The prod_setup graph 702 may read this function from the production, and then call the function for each dataset to get the value of the subsetting filter for each dataset.

The second type of filter, frequency-distribution, is an example of a transformation that is based on a constraint for preserving statistical consistency and involves analyzing the frequency distribution of values across some number of named elements in a dataset instance. A goal of frequency based filtering is to remove records from a source dataset instance, while still maintaining the distribution of values across a set of element value combinations. For example, one may be interested in filtering a_transactions, but do so in a way that maintains a frequency distribution across price, prodid, and transtype fields that is the same as the frequency distribution of values in the original dataset instance. The transform function shown in the listing 1714 shown in FIG. 17G supplied as part of a production may be used by the prod_setup graph to obtain the names of elements from datasets that should be considered for frequency distribution filtering. In addition, this transform may supply an expression that "bucketizes" continuous elements (meaning that a dataset instance may have an unlimited number of values) into an enumeration of values. This allows the prod_run graph subsetting transform step 1206 to group records by discrete sets of values for one or more of the named frequency distribution elements. Once values have been bucketized in this manner, the system may perform subsetting based on the count of records that fall within each bucket group. In this example, the production provides an expression that bucketizes the price on a_transactions and b_transactions, and bucketizes the est_income element of consumer_info. In the case where an expression just returns the value of the element, this means that the set of values is already considered to be a reasonably sized enumeration.

The steps illustrated in FIG. 12D perform the tasks of evaluating and rolling up the counts of records that have unique combinations of values for the frequency-distribution filtering elements named in the production. Once the scan and rollup has been performed, the records are filtered according to both single-record, and frequency-distribution rules. Then, another frequency analysis is performed on the resulting records to show the match of subsetted records to the original records. This data can be written to a histogram chart (e.g., as shown in FIG. 13).

In some examples, a function of a production processor is to write out report information derived from each of the processing steps, rather than write out new, processed dataset instances for each of the dataset instances named in a production.

Figure 13:
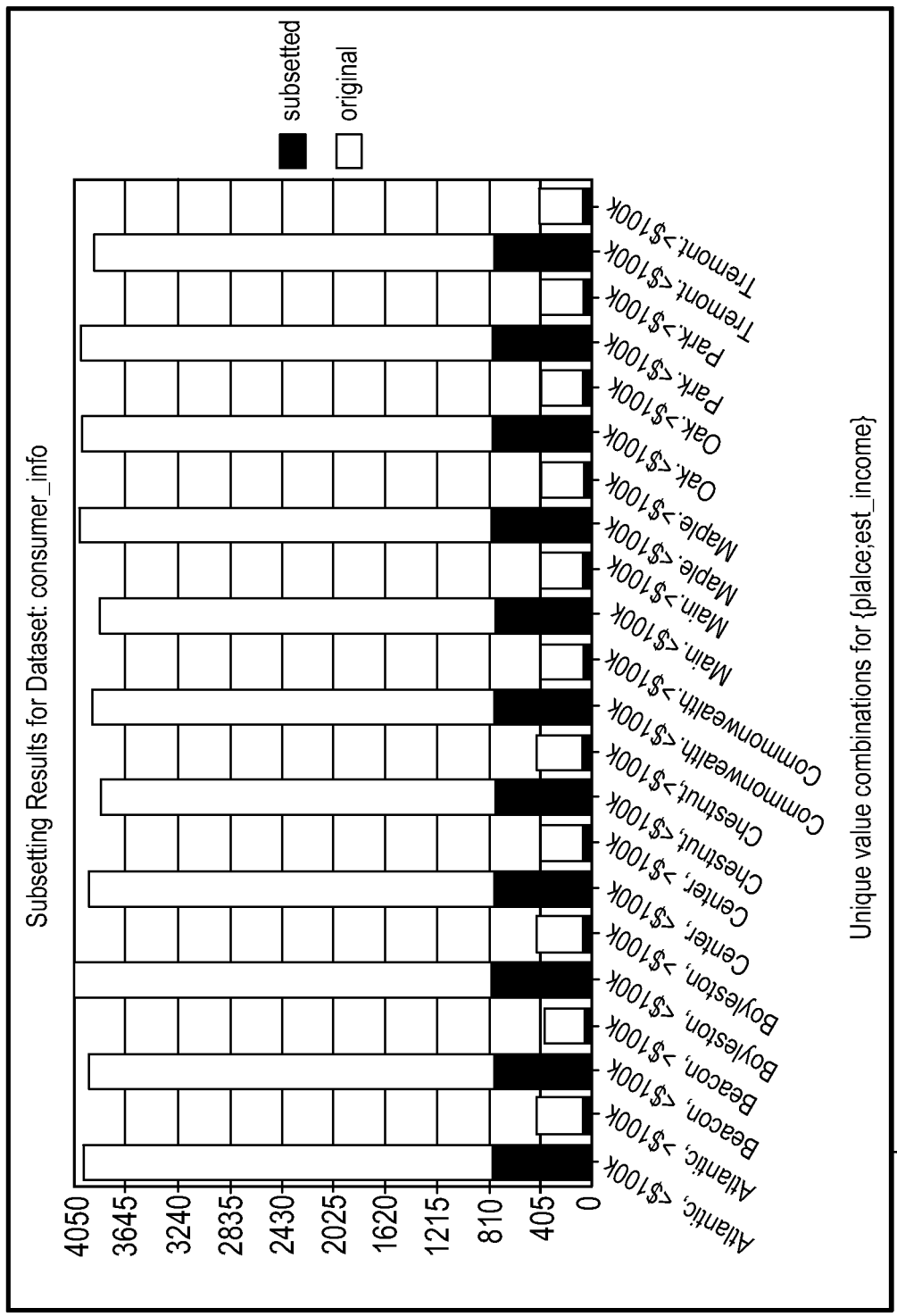
FIG. 13 is a plot illustrating a frequency distribution.

FIG. 13 shows a generated histogram 1300 of results from having applied a subsetting transform using a production rule calling for a reduction by a factor of 5 while maintaining statistical consistency as characterized by a frequency distribution over place and est_income elements. The histogram 1300 shows frequency distribution results from a subsetting operation applied to the consumer_info dataset.

Figure 12E:
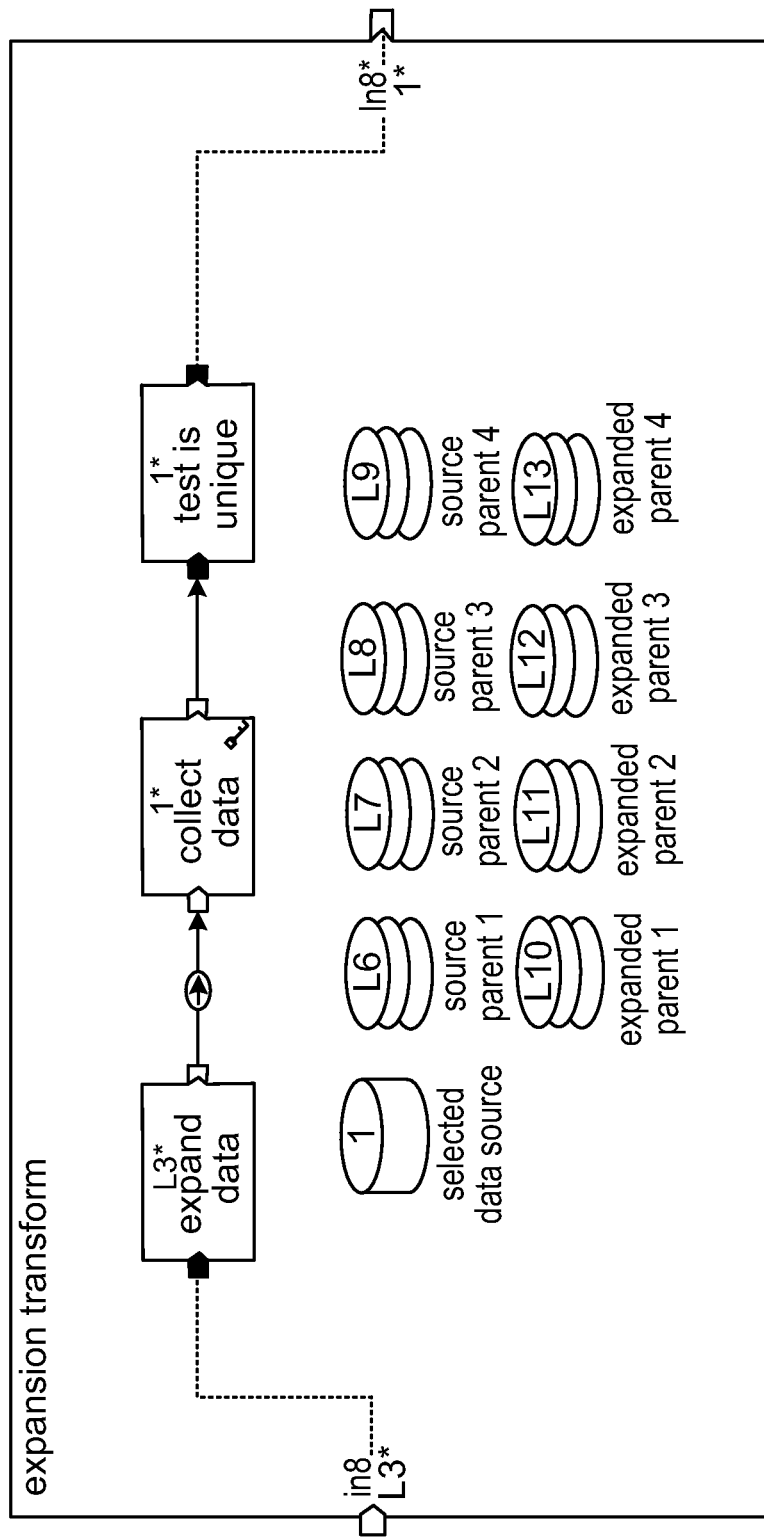

FIG. 12E shows an embodiment of an expansion transform process step 1210 that may apply custom fan-out rules to each of the N copied records in a source dataset instance.

Expansion is the process of creating new records in one or more dataset instances. The records may be created from scratch, or by copying existing records. If a record being copied has dependencies on records in other datasets (as defined in the conspec), then the production decides whether or not to "wire up" the new records in the child dataset instance to those in the parent dataset instances. Alternatively, the production may copy the parent records as well, and wire up the new children to point to the new parents. In this manner, collections of related records may be copied while maintaining referential integrity.

Figure 12F:
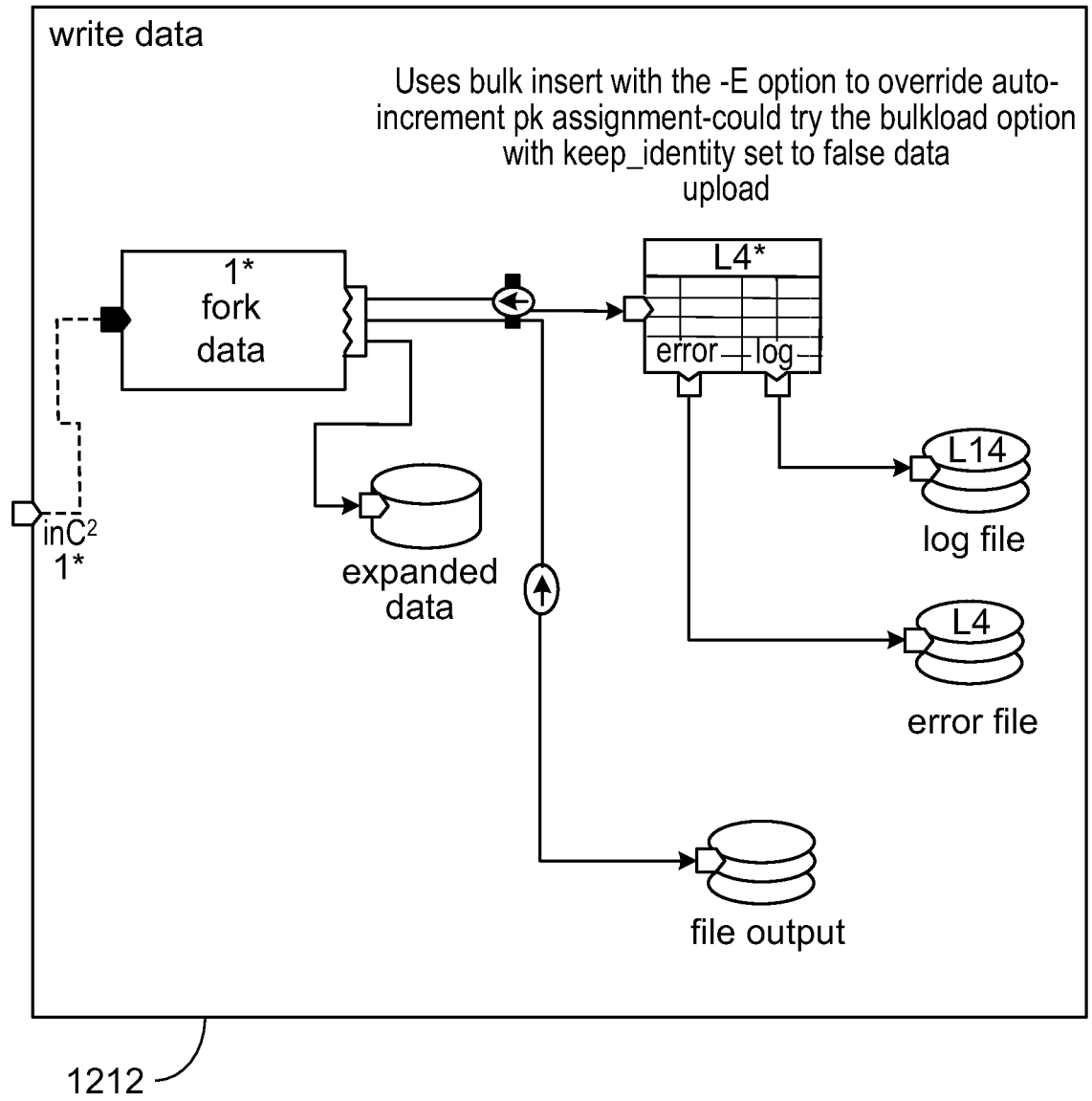

FIG. 12F shows the final step 1212 of the prod_run graph 1200, the write data function.

Figure 14:
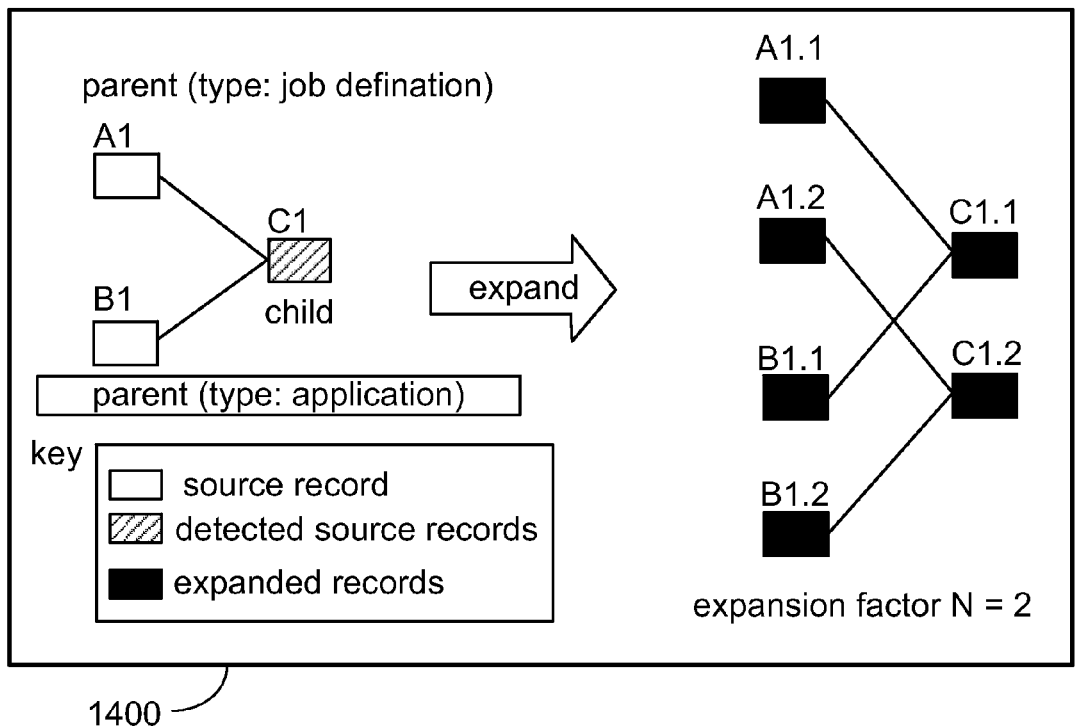
FIG. 14 is a schematic diagram illustrating an expansion operation.

FIG. 14 illustrates an expansion 1400 where records in multiple datasets within a conspec (in this example, a conspec associated with an application that enables monitoring of runtime execution of jobs performed by dataflow graphs) are to be expanded. In this case, the production first copies job definitions and applications, and then copies jobs. Each new job is wired up so as to reference each new job definition and application. Before tackling the job of expanding the records in each dataset instance, the production first determines the overall processing order of the datasets. In this case, no child should be processed before all dependent parents have been processed—where a child is a dataset that has a foreign key reference to a primary key in a parent dataset.

In the most basic expansion, a production processor may copy N new records using each original record as a template. Each field of each new record is processed to ensure that it gets a new value when it comprises a primary, foreign and/or unique key. In the case of primary keys, new values are selected to not conflict with existing key values. In the case of foreign keys, values are altered in order to point to the corresponding new primary key values of the new expanded parent records. In the case of unique keys, values are altered from the originals to ensure uniqueness within the space of all records of that type. For example, a GUID field can be made unique.

In addition to performing these field expansion rules, an expansion production processor also supports the input of user defined field expansion rules on a type-by-type basis. The goal here is to enable the processor to expand and simultaneously "spread out" field values across multiple dimensions. For example, a user may want to expand a set of job definitions. However, each new job definition may require its scheduled start time to be incremented by some amount from the original scheduled start time.

One way of specifying field expansion rules is by embedding a DML function in a production. The exemplary DML function shown in the listing 1716 shown in FIG. 17H illustrates a custom expansion rule generator that outputs a default rule for all cases except for the scheduled start time on a job, and a GUID field on a job definition dependency. In the first case, the function constructs a rule that adds the number of seconds corresponding to the current expansion index value to the new record's scheduled start time. With this rule, new jobs get incremented start times that are evenly distributed over a number of seconds corresponding to the size of the expansion. In the case of the GUID, the function invokes the production processor's key generation function because the GUID is supposed to behave as if it were a foreign key reference. As a result of calling this function, the rule will assign the same expanded key value to the GUID value here as was assigned to the GUID in the expanded source table.

The function "getExpandedKeyRule( )" is one of the system functions supported by the expansion production processor.

Certain child dataset types can be explicitly blocked from inclusion as sources. Some expansions require that the user be able to specify children to exclude from expansion processing. For example, with respect to the conspec associated with a job scheduling application, a user may want to expand a job definition that may already have a collection of jobs that ran on previous days. The user may want to expand the job definitions, but not want to expand the jobs. In order to support optional exclusion of child objects, the tool may accept an input parameter for declaring a list of children to exclude.

Sources can be explicitly excluded from being expanded, but still used to traverse children recursively. Some expansions may require that a table be selected as a source, and furthermore, that objects from this table be filtered. In addition, the expansion may require that the filtered selection be used to narrow the selection of child objects. At the same time, the user may not want to expand the source parent objects, and instead, only wants to expand the selected set of child objects. In this case, the user specifies the source as a means of narrowing the selection of children, but then excludes the source from the expansion (i.e. copying of selected objects).

For example, with respect to the conspec associated with a job scheduling application, the user may want to expand jobs that are associated with job definitions whose names start with the string "Canada". The user would specify job definition to be the source, and would explicitly exclude all of its children from source selection (except for jobs). The user would specify a selection filter for job definitions. Finally, the user would specify to exclude job definitions from the expansion.

This approach can allow types to participate as sources for filtering and child detection, but also be excluded from the expansion process.

Modification (also called "masking") is the process of replacing values in one or more fields of a record. In some cases, groups of fields are operated upon in unison in order to maintain consistency constraints within a record (such as with city and zip codes), while in other cases, field values across datasets are operated upon in unison in order to maintain referential integrity. The following sections provide an overview of the different kinds of production rules that may be supported by a generic masking production processor.

The shuffling algorithm swaps values within one or more fields using values from other records in the dataset. The selection of new values may be driven by either key or lookup-based mapping functions (see below). The algorithm may also maintain the frequency distribution of values in the original data, or produce a flat distribution of masked values.

The masking production processor also supports multi-field shuffling, whereby blocks of field values from one record are shuffled between corresponding values from another record. This is particularly useful for ensuring that male and female names are associated with logical titles and genders, and that zip codes are associated with valid cities and states.

The substitution algorithm selects values from an external supply of fictitious values. Unlike shuffling, original values are not used, making it possible to hide whether a specific value exists (regardless of which record) in the original data.

The generation algorithm uses domain specific formulas designed for specific types of fields. Standard formulas exist for fields of type: credit card, social security, phone, date, email. Additionally, formulas may be used to derive check sums in cases where randomization is used on a portion of a value.

Encryption provides a straight forward means of masking with the ability to decrypt back to the original value. Encrypted values may pass through an application, but will typically not pass as valid data for certain types of fields.

The randomization algorithm produces a random string of letters and/or numbers. This can be done in a repeatable or non-repeatable manner, i.e., one may choose to have the same source string always map to the same masked string, or not.

The offsetting algorithm transforms input values within ranges of acceptable outputs. This approach may be used to vary fields such as dates, quantities, currencies, etc, by small amounts that maintain desired global characteristics. For example, one may maintain a pattern of large versus small transaction values among customers, but change the values by small amounts. In another example, one may alter ages while maintaining the overall age distribution.

The scrubbing algorithm obliterates a field or a portion of its content with a common or null value.

Custom functions may be associated with specific fields, and these functions may access one or more fields from the record undergoing masking.

The masking production processor may use a cryptographically secure hashing algorithm or a pseudo-random permutation function to derive lookup indices. Lookup tables that map indices to masked values need not be protected since the key used to derive the index is secured instead. Cryptographic hashing applies well to infinite domain data, or data with unequal distributions, such as names and addresses. Pseudo-random permutation applies well to finite domain data, or data with equal distributions, such as IDs.

The masking production processor may use a hashing or permutation function to derive a masked value for each input value, and then stores the mapping of original to masked values in a secured lookup table. The table explicitly maintains mappings between masked and unmasked values, and therefore, needs to be maintained in a secured environment.

Other production processor functions can include direction of processing, for example, parents to children or children to parents. Because a conspec comprises many interdependent datasets, one of the core functions of productions is determining the order in which to process the dataset instances.

Depending upon the rules specified in a production, the production processor may need to process parents first followed by children, recursively, or alternatively, process children first followed by parents, recursively. In the previous section, the production called for selecting customers first, and then children to end up with only the children dependent upon the selected parents. In an alternative scenario, a user might have specified to select only high dollar amount transactions greater than value X, and end up with only the customers needed to back up these transactions. In this case, the processor would have had to process children first, followed by parents. The processor has the capability to detect the correct processing order and apply it as needed.

Sometimes, a user will want to narrow the scope of processing by specifying a subset of the datasets as sources. Additionally, a user may want to explicitly exclude certain datasets for inclusion as parents or children. The generic functions for determining processing order should accept these parameters as arguments.

Primary key assignment is a technique for avoiding identifier (ID) conflicts across productions. A production may generate new records in a dataset instance, either from scratch, or by copying. These new records will often need new IDs, and therefore, the production ensures that new ID values don't conflict with existing ID values. Additionally, a production ensures that the ID values it generates in one run don't conflict with ID values it may generate in subsequent runs.

There are a number of ways of ensuring that IDs fall within namespaces that are unique to each run of a production. Following is an example of an approach to generating non-conflicting numeric IDs within a run, as well as across runs.

Figure 15:
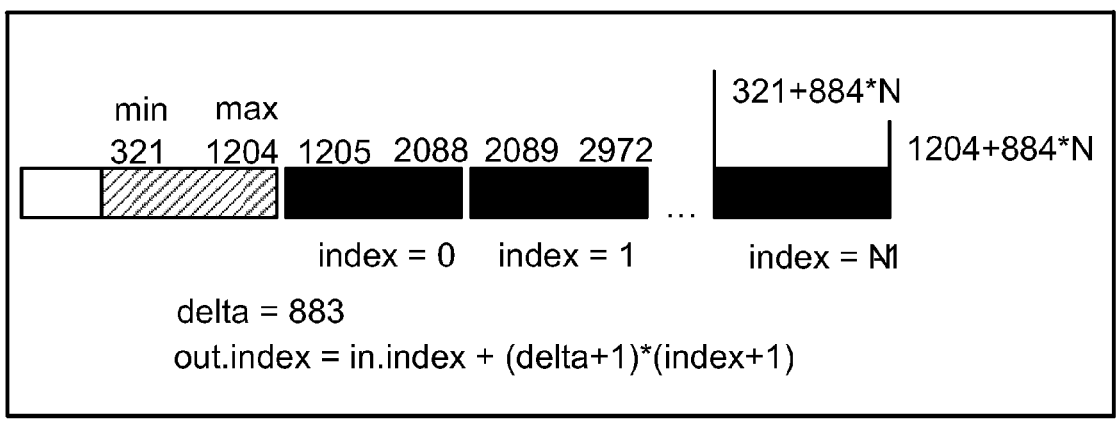
FIG. 15 is a chart illustrating ranges of index values.

For numeric primary keys, the production may begin by computing the current Min and Max values of the primary key field(s) within a dataset instance. In FIG. 15, the current range 1502 is shown as shaded. For example, if the production has a rule to copy each of the existing records N times. Before copying any records, the production needs to first logically organize, or set aside, a set of N new ranges of unused IDs to hold the new records. Then, each of the N new records for each of the existing records would be assigned an ID value from one of the N ranges. So, for example, if the existing index value for a key were 321, then the production would create N new records for 321, and these would be given ID values of 1205, 2089, . . . , 321+884*N. In other words, each new record would be dumped into one of the blue range buckets shown below. Similarly, for the second record with ID 322, the production would create N new objects with values of 1206, 2090, . . . , 322+884*N.

For non-numeric key fields, such as GUIDs, the production may first generate a unique RANDOM_RUN_SEED at the beginning of the run, and append this key and the expansion index number to each GUID. If the production were run again, it would use a different random seed, which would ensure that keys are unique across multiple layered runs of the production.

The listing 1718 shown in FIG. 17I is an example of the generated transform rule for assigning a new GUID to an expanded job record with respect to the conspec associated with a job scheduling application. "pN" is the value of the RANDOM_RUN_SEED.

These approaches for expanded key generation ensure uniqueness across runs of productions. This makes it possible for users to run a production multiple times, or chain productions of different types together.

The dataset processing techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for processing related datasets, the method including:
    receiving over an input device or port records from multiple datasets, the records of a given dataset having one or more values for one or more respective fields; and
    processing records from each of the multiple datasets in a data processing system, the processing including
        analyzing at least one constraint specification stored in a data storage system to determine a processing order for the multiple datasets, the constraint specification specifying one or more constraints for preserving referential integrity or statistical consistency among a group of related datasets that includes the multiple datasets,
        applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and
        storing or outputting results of the transformations to the records from each of the multiple datasets.

2. The method of claim 1, wherein at least one constraint for preserving referential integrity specified by the constraint specification is based on dependence of values for a field of the second dataset on values for a field of the first dataset.

3. The method of claim 2, wherein the field of the first dataset is a primary key and the field of the second dataset is a foreign key that references the primary key.

4. The method of claim 3, wherein the constraint specification includes a representation of a foreign key to primary key relationship between the field of the second dataset and the field of the first dataset.

5. The method of claim 2, wherein determining the processing order for the multiple datasets includes determining that the first dataset occurs before the second dataset in the processing order based on the dependence of values for the field of the second dataset on values for the field of the first dataset.

6. The method of claim 1, wherein the transformations are applied to records from a third dataset of the multiple datasets before the transformations are applied to records from the second dataset and after the transformations are applied to records from the first dataset.

7. The method of claim 1, wherein at least one constraint for preserving statistical consistency specified by the constraint specification is based on an equivalence between a field of the second dataset and a field of the first dataset.

8. The method of claim 7, wherein the field of the first dataset and the field of the second dataset are keys in a join operation.

9. The method of claim 8, wherein the constraint specification includes a representation of the join operation.

10. The method of claim 1, further including profiling the datasets in the group of related datasets to determine statistics associated with multiple fields, including at least one field of the first dataset and at least one field of the second dataset that is indicated by the constraint specification as being equivalent to the field of the first dataset.

11. The method of claim 10, wherein the one or more transformations applied to the records from the second dataset are applied based at least in part on preserving a statistical consistency between a distribution of values in the field of the first dataset and a distribution of values in the field of the second dataset according to the determined statistics and the results of applying the transformations to the records from the first dataset.

12. The method of claim 1, wherein the one or more transformations are applied by at least one dataflow graph that includes nodes representing data processing components connected by links representing flows of records between data processing components, with each dataset to which the transformations are being applied providing an input flow of records to the dataflow graph.

13. The method of claim 12, wherein the dataflow graph is executed successively in multiple iterations using a respective one of the multiple datasets to provide an input flow of records, in the determined processing order for the multiple datasets.

14. The method of claim 1, wherein the one or more transformations applied to records of a given dataset include a subsetting transformation that reduces a number of records in the given dataset based on values in at least one field of the given dataset.

15. The method of claim 1, wherein the one or more transformations applied to records of a given dataset include a modification transformation that modifies values in at least one field of the dataset.

16. The method of claim 1, wherein the one or more transformations applied to records of a given dataset include an expansion transformation that increases a number of records in the given dataset based on duplication of values in at least one field of the given dataset.

17. The method of claim 1, further including:
analyzing at least one constraint specification stored in the data storage system to determine a processing order for resulting datasets that result from applying the transformations to the records from each of the multiple datasets, the constraint specification specifying one or more constraints for preserving referential integrity or statistical consistency among a group of related datasets that includes the resulting datasets,
applying one or more transformations to records from each of the resulting datasets in the determined processing order, where the transformations are applied to records from a first dataset of the resulting datasets before the transformations are applied to records from a second dataset of the resulting datasets, and the transformations applied to the records from the second dataset are applied based at least in part on results of applying the transformations to the records from the first dataset and at least one constraint between the first dataset and the second dataset specified by the constraint specification, and
storing or outputting results of the transformations to the records from each of the resulting datasets.

18. A non-transitory computer-readable medium storing a computer program for processing related datasets, the computer program including instructions for causing a computer to:
receive over an input device or port records from multiple datasets, the records of a given dataset having one or more values for one or more respective fields; and
process records from each of the multiple datasets in a data processing system, the processing including
analyzing at least one constraint specification stored in a data storage system to determine a processing order for the multiple datasets, the constraint specification specifying one or more constraints for preserving referential integrity or statistical consistency among a group of related datasets that includes the multiple datasets,
applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and
storing or outputting results of the transformations to the records from each of the multiple datasets.

19. A data processing system for processing related datasets, the system including:
a data storage system;
an input device or port configured to receive records from multiple datasets, the records of a given dataset having one or more values for one or more respective fields; and
at least one processor in communication with the input device or port and the data storage system, and configured to process records from each of the multiple datasets, the processing including
analyzing at least one constraint specification stored in the data storage system to determine a processing order for the multiple datasets, the constraint specification specifying one or more constraints for preserving referential integrity or statistical consistency among a group of related datasets that includes the multiple datasets,
applying one or more transformations to records from each of the multiple datasets in the determined processing order, where the transformations are applied to records from a first dataset of the multiple datasets before the transformations are applied to records from a second dataset of the multiple datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the multiple datasets.

20. The medium of claim 18, wherein at least one constraint for preserving referential integrity specified by the constraint specification is based on dependence of values for a field of the second dataset on values for a field of the first dataset.

21. The medium of claim 20, wherein the field of the first dataset is a primary key and the field of the second dataset is a foreign key that references the primary key.

22. The medium of claim 21, wherein the constraint specification includes a representation of a foreign key to primary key relationship between the field of the second dataset and the field of the first dataset.

23. The medium of claim 20, wherein determining the processing order for the multiple datasets includes determining that the first dataset occurs before the second dataset in the processing order based on the dependence of values for the field of the second dataset on values for the field of the first dataset.

24. The medium of claim 18, wherein the transformations are applied to records from a third dataset of the multiple datasets before the transformations are applied to records from the second dataset and after the transformations are applied to records from the first dataset.

25. The medium of claim 18, wherein at least one constraint for preserving statistical consistency specified by the constraint specification is based on an equivalence between a field of the second dataset and a field of the first dataset.

26. The medium of claim 25, wherein the field of the first dataset and the field of the second dataset are keys in a join operation.

27. The medium of claim 26, wherein the constraint specification includes a representation of the join operation.

28. The medium of claim 18, further including profiling the datasets in the group of related datasets to determine statistics associated with multiple fields, including at least one field of the first dataset and at least one field of the second dataset that is indicated by the constraint specification as being equivalent to the field of the first dataset.

29. The medium of claim 28, wherein the one or more transformations applied to the records from the second dataset are applied based at least in part on preserving a statistical consistency between a distribution of values in the field of the first dataset and a distribution of values in the field of the second dataset according to the determined statistics and the results of applying the transformations to the records from the first dataset.

30. The medium of claim 18, wherein the one or more transformations are applied by at least one dataflow graph that includes nodes representing data processing components connected by links representing flows of records between data processing components, with each dataset to which the transformations are being applied providing an input flow of records to the dataflow graph.

31. The medium of claim 30, wherein the dataflow graph is executed successively in multiple iterations using a respective one of the multiple datasets to provide an input flow of records, in the determined processing order for the multiple datasets.

32. The medium of claim 18, wherein the one or more transformations applied to records of a given dataset include a subsetting transformation that reduces a number of records in the given dataset based on values in at least one field of the given dataset.

33. The medium of claim 18, wherein the one or more transformations applied to records of a given dataset include a modification transformation that modifies values in at least one field of the dataset.

34. The medium of claim 18, wherein the one or more transformations applied to records of a given dataset include an expansion transformation that increases a number of records in the given dataset based on duplication of values in at least one field of the given dataset.

35. The medium of claim 18, wherein the computer program further includes instructions for causing a computer to:

analyzing at least one constraint specification stored in the data storage system to determine a processing order for resulting datasets that result from applying the transformations to the records from each of the multiple datasets, the constraint specification specifying one or more constraints for preserving referential integrity or statistical consistency among a group of related datasets that includes the resulting datasets, applying one or more transformations to records from each of the resulting datasets in the determined processing order, where the transformations are applied to records from a first dataset of the resulting datasets before the transformations are applied to records from a second dataset of the resulting datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the resulting datasets.

36. The system of claim 19, wherein at least one constraint for preserving referential integrity specified by the constraint specification is based on dependence of values for a field of the second dataset on values for a field of the first dataset.

37. The system of claim 36, wherein the field of the first dataset is a primary key and the field of the second dataset is a foreign key that references the primary key.

38. The system of claim 37, wherein the constraint specification includes a representation of a foreign key to primary key relationship between the field of the second dataset and the field of the first dataset.

39. The system of claim 36, wherein determining the processing order for the multiple datasets includes determining that the first dataset occurs before the second dataset in the processing order based on the dependence of values for the field of the second dataset on values for the field of the first dataset.

40. The system of claim 19, wherein the transformations are applied to records from a third dataset of the multiple datasets before the transformations are applied to records from the second dataset and after the transformations are applied to records from the first dataset.

41. The system of claim 19, wherein at least one constraint for preserving statistical consistency specified by the constraint specification is based on an equivalence between a field of the second dataset and a field of the first dataset.

42. The system of claim 41, wherein the field of the first dataset and the field of the second dataset are keys in a join operation.

43. The system of claim 42, wherein the constraint specification includes a representation of the join operation.

44. The system of claim 19, further including profiling the datasets in the group of related datasets to determine statistics associated with multiple fields, including at least one field of the first dataset and at least one field of the second dataset that is indicated by the constraint specification as being equivalent to the field of the first dataset.

45. The system of claim 44, wherein the one or more transformations applied to the records from the second dataset are applied based at least in part on preserving a statistical consistency between a distribution of values in the field of the first dataset and a distribution of values in the field of the second dataset according to the determined statistics and the results of applying the transformations to the records from the first dataset.

46. The system of claim 19, wherein the one or more transformations are applied by at least one dataflow graph that includes nodes representing data processing components connected by links representing flows of records between data processing components, with each dataset to which the transformations are being applied providing an input flow of records to the dataflow graph.

47. The system of claim 46, wherein the dataflow graph is executed successively in multiple iterations using a respective one of the multiple datasets to provide an input flow of records, in the determined processing order for the multiple datasets.

48. The system of claim 19, wherein the one or more transformations applied to records of a given dataset include a subsetting transformation that reduces a number of records in the given dataset based on values in at least one field of the given dataset.

49. The system of claim 19, wherein the one or more transformations applied to records of a given dataset include a modification transformation that modifies values in at least one field of the dataset.

50. The system of claim 19, wherein the one or more transformations applied to records of a given dataset include an expansion transformation that increases a number of records in the given dataset based on duplication of values in at least one field of the given dataset.

51. The system of claim 19, wherein the processing further includes:

analyzing at least one constraint specification stored in the data storage system to determine a processing order for resulting datasets that result from applying the transformations to the records from each of the multiple datasets, the constraint specification specifying one or more constraints for preserving referential integrity or statistical consistency among a group of related datasets that includes the resulting datasets, applying one or more transformations to records from each of the resulting datasets in the determined processing order, where the transformations are applied to records from a first dataset of the resulting datasets before the transformations are applied to records from a second dataset of the resulting datasets, and the transformations applied to the records from the second dataset are applied based at least in part on results of applying the transformations to the records from the first dataset and at least one constraint between the first dataset and the second dataset specified by the constraint specification, and storing or outputting results of the transformations to the records from each of the resulting datasets.

\* \* \* \* \*